US010728196B2

(12) United States Patent
Wang

(10) Patent No.: US 10,728,196 B2
(45) Date of Patent: Jul. 28, 2020

(54) METHOD AND STORAGE MEDIUM FOR VOICE COMMUNICATION

(71) Applicant: Beijing Xiaomi Mobile Software Co., Ltd., Haidian District, Beijing (CN)

(72) Inventor: Ke Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 188 days.

(21) Appl. No.: 15/893,697

(22) Filed: Feb. 12, 2018

(65) Prior Publication Data
US 2018/0248823 A1  Aug. 30, 2018

(30) Foreign Application Priority Data
Feb. 28, 2017 (CN) .......................... 2017 1 0111296

(51) Int. Cl.
*H04L 12/58* (2006.01)
*G10L 15/22* (2006.01)

(52) U.S. Cl.
CPC .............. *H04L 51/10* (2013.01); *G10L 15/22* (2013.01); *H04L 51/08* (2013.01)

(58) Field of Classification Search
CPC ..... H04M 2203/2011; H04M 3/42059; H04M 3/436; H04M 3/533; H04M 2203/4563;
(Continued)

(56) References Cited

U.S. PATENT DOCUMENTS 7,035,382 B1 * 4/2006 Shin .................. H04M 3/53333
379/88.12
7,295,660 B1 * 11/2007 Higginbotham ...... H04M 3/436
379/196
(Continued)

FOREIGN PATENT DOCUMENTS

| CN | 101175049 A | 5/2008 |
| CN | 103986698 A | 8/2014 |
| CN | 106375182 A | 2/2017 |

OTHER PUBLICATIONS

The extended European search report issued in European application No. 18158998.7, dated Oct. 2, 2018.
(Continued)

*Primary Examiner* — Ninos Donabed
(74) *Attorney, Agent, or Firm* — Jun He Law Offices P.C.; James J. Zhu

(57) ABSTRACT

The present disclosure relates to a method, device, system and storage medium for voice communication. The method includes acquiring a first operation instruction, the first operation instruction for instructing to acquire a supplementary voice content of a first voice message; acquiring the supplementary voice content of the first voice message according to the first operation instruction; generating a second voice message according to the supplementary voice content and a supplementary identification, the supplementary identification for indicating that the voice content included in the second voice message is a supplementary voice content; and sending the second voice message to the server. In the present disclosure, a terminal may add a supplementary voice content on the basis of the sent voice message according to an instruction of the user.

18 Claims, 15 Drawing Sheets

(58) Field of Classification Search
CPC ....... H04M 2203/651; H04M 3/42042; H04M 1/72552; G06Q 10/06; G06Q 10/06311; G06Q 10/063118; G06Q 10/10; G06Q 30/02; H04L 63/04; H04L 63/162; H04L 51/08; H04L 51/10
See application file for complete search history.

(56) References Cited

U.S. PATENT DOCUMENTS

| | | | | |
|---|---|---|---|---|
| 7,532,710 | B2* | 5/2009 | Caputo | H04M 3/533 379/88.12 |
| 7,877,084 | B2* | 1/2011 | Martin | H04M 3/436 455/414.1 |
| 8,683,355 | B1* | 3/2014 | Gailloux | H04L 51/10 709/204 |
| 8,824,681 | B2* | 9/2014 | Senese | H04W 12/08 380/270 |
| 2005/0063523 | A1* | 3/2005 | Jupe | H04M 3/436 379/88.12 |
| 2005/0069109 | A1* | 3/2005 | Elias | H04M 15/06 379/111 |
| 2005/0100145 | A1* | 5/2005 | Spencer | H04M 3/436 379/88.22 |
| 2007/0192427 | A1* | 8/2007 | Berstis | G06Q 10/10 709/207 |
| 2009/0318119 | A1* | 12/2009 | Basir | H04M 1/271 455/413 |
| 2010/0142684 | A1* | 6/2010 | Chang | H04M 3/533 379/88.14 |
| 2010/0167699 | A1* | 7/2010 | Sigmund | H04M 3/53383 455/413 |
| 2010/0305807 | A1* | 12/2010 | Basir | B60R 16/0373 701/31.4 |
| 2011/0117882 | A1* | 5/2011 | Luu | H04M 3/533 455/410 |
| 2013/0191145 | A1* | 7/2013 | Nudd | G06Q 10/063118 705/2 |
| 2013/0253971 | A1* | 9/2013 | Nudd | G06Q 10/06 705/7.14 |
| 2013/0304533 | A1* | 11/2013 | Nudd | G06Q 10/063118 705/7.15 |
| 2014/0039962 | A1* | 2/2014 | Nudd | G06Q 10/1097 705/7.21 |
| 2014/0172539 | A1* | 6/2014 | Alsina | H04W 4/21 705/14.39 |
| 2015/0256679 | A1* | 9/2015 | Burnett | H04M 3/533 379/88.12 |
| 2016/0072951 | A1* | 3/2016 | Zhou | H04M 11/10 455/413 |
| 2016/0219153 | A1* | 7/2016 | Honea | H04M 3/53391 |
| 2016/0381225 | A1* | 12/2016 | Messenger | H04M 3/537 455/415 |

OTHER PUBLICATIONS

The First Office Action in Chinese Patent Application No. 201710111296.8, dated Sep. 4, 2019.

* cited by examiner

_(1)_

METHOD AND STORAGE MEDIUM FOR VOICE COMMUNICATION

CROSS-REFERENCE TO RELATED APPLICATION

This application is based upon and claims priority to Chinese patent application No. 201710111296.8, filed Feb. 28, 2017, which is incorporated herein by reference in its entirety.

TECHNICAL FIELD

The present disclosure relates to the field of communication technology, and more particularly, to a method, device, system, and storage medium for voice communication.

BACKGROUND

With the development of communication technology, mobile phones have been used more widely, which has expanded social scopes of users. In turn, with the expansion of social scopes, the opportunities for users to communicate through instant communication softwares in mobile phones are increased. In related art, a user may send texts, pictures or voices through an instant communication software. Since voice messages do not require users to type and are more convenient and faster, they have become a preferred form for users when executing instant communications.

SUMMARY

In order to overcome problems existing in the related art, embodiments of the present disclosure provide a method, device, system, and storage medium for voice communication. The technical solutions are as follows.

According to the first aspect of the embodiments of the present disclosure, a method for voice communication is provided, including:

acquiring a first operation instruction for instructing to acquire a supplementary voice content of a first voice message;

acquiring the supplementary voice content of the first voice message according to the first operation instruction;

generating a second voice message according to the supplementary voice content, the second voice message including a supplementary identification for indicating that the voice content included in the second voice message is a supplementary voice content; and sending the second voice message to the server.

According to the second aspect of the embodiments of the present disclosure, a method for voice communication is provided, including:

receiving a third voice message from a first terminal;

detecting whether the third voice message carries a supplementary identification, the supplementary identification for indicating that a voice content included in the third voice message is a supplementary voice content; and sending the voice content included in the third voice message to a second terminal as a supplementary voice content of a fourth voice message when the third voice message carries the supplementary identification, the fourth voice message being a voice message sent from the first terminal to the second terminal before the first terminal sends the third voice message.

According to the third aspect of the embodiments of the present disclosure, a method for voice communication is provided, including:

receiving a voice supplementing request from a server, the voice supplementing request for requesting taking a voice content included in a third voice message as a supplementary voice content of a fourth voice message, the fourth voice message being a voice message received before receiving the third voice message, the voice supplementing request carrying the third voice message, a supplementary identification and an identification of the fourth voice message, the supplementary identification for indicating that the voice content included in the third voice message is a supplementary voice content, and the identification of the fourth voice message for uniquely identifying the fourth voice message; and taking the voice content included in the third voice message as the supplementary voice content of the fourth voice message according to the voice supplementing request.

It should be understood that both the foregoing general description and the following detailed description are exemplary and explanatory only and are not restrictive to the disclosure.

BRIEF DESCRIPTION OF THE DRAWINGS

The accompanying drawings, which are incorporated in and constitute a part of this specification, illustrate embodiments consistent with the disclosure, and explain the principles of the disclosure in conjunction with the description.

DETAILED DESCRIPTION

Figure 1A:
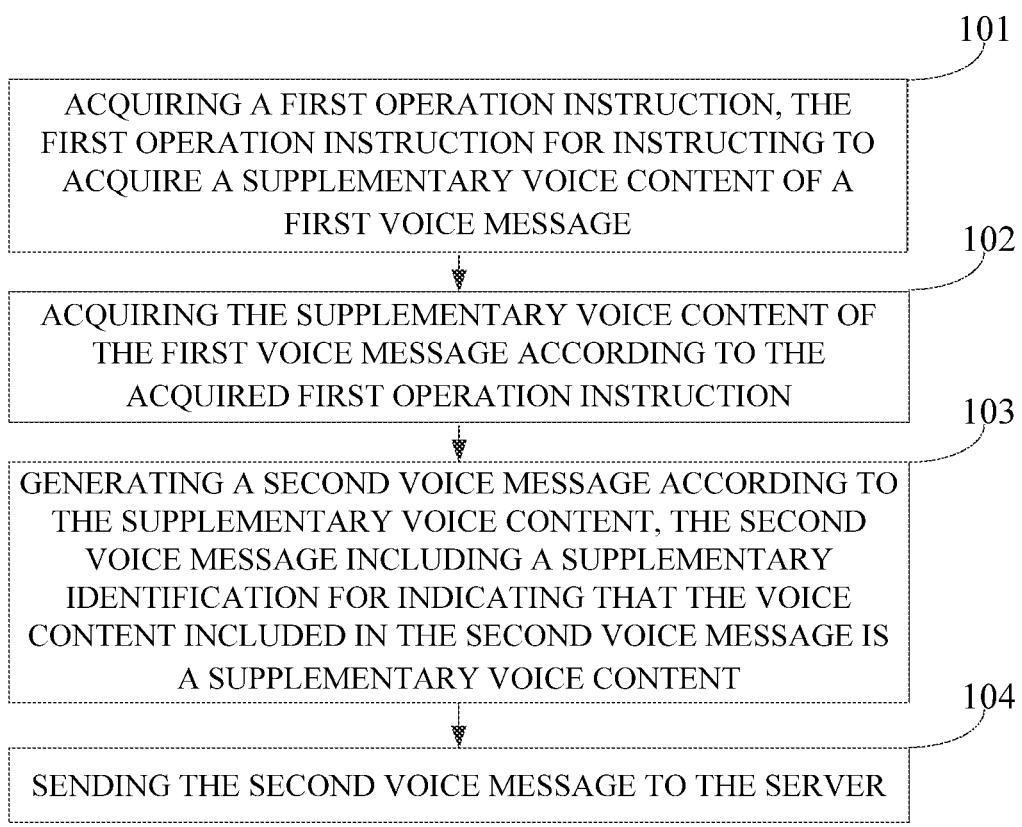
FIG. 1a is a flowchart illustrating a method for voice communication according to an exemplary embodiment.

Detailed description will now be made to exemplary embodiments, examples of which are illustrated in the accompanying drawings. The following description refers to the accompanying drawings in which the same numbers in different drawings represent the same or similar elements unless otherwise indicated. The implementations set forth in the following description of the exemplary embodiments do not represent all implementations consistent with the disclosure. Instead, they are merely examples of devices and methods consistent with some aspects of the disclosure as recited in the appended claims.

The technical solutions provided by the embodiments of the present disclosure relate to a server and terminals. The terminals may be a mobile phone, a tablet computer, a smart watch or other devices capable of voice communication. The server may be a server provided by an operator, or a server provided by a third party, which is not limited by the embodiments of the present disclosure. In the related art, when sending a voice message, the user may click a voice icon on a chat interface. Then, the sending terminal may turn on a microphone, receive a voice content input from the user and send the voice content to the server. The server sends the voice message to a receiving terminal and thus information communication between the sending terminal and the receiving terminal is achieved.

In practical applications, due to network reasons or artificial reasons, sometimes it is possible that the voice message received by the receiving terminal is incomplete, or the voice message sent from the sending terminal is not the user truly wants to send, or the use misspeaks in the voice message but cannot withdraw. For example, the microphone is turned on because of the wrong touch of the first terminal by the user but the user of the first terminal does not input any voice content, resulting in no useful content in the sent voice message. In another example, due to a network reason, the first terminal only sends a part of the voice content of the first voice message and the other part of the voice content is lost, resulting in an incomplete voice message received by the receiving terminal.

The above situations may cause misguidance or confusion to the user of the receiving terminal or the user of the sending terminal, resulting in an undesired user experience. In an embodiment of the present disclosure, a terminal may add a supplementary voice content on the basis of a sent voice message according to an instruction of the user. By sending a supplementary voice content carrying a supplementary identification to the server, a server may be instructed to send the supplementary voice content to the opposite terminal. In this embodiment, when the terminal sends a voice message to the opposite terminal, the situation that the opposite terminal receives an incomplete voice message due to poor network environment or user reasons can be effectively avoided. Moreover, an opportunity for the user of the terminal to modify the sent voice message is offered, thus improving user experience.

FIG. 1a is a flowchart illustrating a method for voice communication according to an exemplary embodiment. As shown in FIG. 1a, the method for voice communication includes blocks 101-104 that follow.

At block 101, a first operation instruction is acquired, the first operation instruction for instructing to acquire a supplementary voice content of a first voice message.

In an example, the terminal may send a voice message in various ways, such as in an instant communication application, or in a short message application, or in a game application with voice chatting function, which is not limited by the embodiment of the present disclosure.

In an embodiment, taking the instant communication application as an example, after a user sends a first voice message, for example, if the user recognizes that the first voice message is incomplete, or the user recognizes that the voice content in the first voice message contains wrong expression, a further operation on the terminal can be taken to instruct the terminal to acquire the supplement voice content of the first voice message. Optionally, the supplement voice content may be presented on the terminal as corresponding to the same voice icon of the first voice message. It should be noted that, assuming that the first voice message may be read on the terminal by clicking a "first voice bubble" in a chatting interface, corresponding to the same voice icon refers to that after the supplementary voice is generated successfully, the user may read the above supplementary voice content by clicking the first voice bubble.

It should be noted that, the supplementary voice content may be presented in a manner including but not limited to the above manners, which is not specifically limited by the present disclosure. For example, supplementary voice contents may be presented on the chatting interface successively according to the generating time order of generated voice contents. For example, the supplementary voice content may occupy a separate voice bubble, and is presented with a connection to the voice message (i.e. the above first voice message) to which the supplementary voice content belongs. For example, the voice bubble corresponding to the supplementary voice content may be connected to the voice bubble corresponding to the first voice message by a connecting line. For another example, after receiving the supplementary voice content of the first voice message, the voice bubble corresponding to the first voice message and the voice bubble corresponding to the supplementary voice content may "flicker" simultaneously, to prompt the user about the connection between the two.

Optionally, the above process of acquiring the first operation instruction may be implemented through clicking the icon (for example, a voice bubble) corresponding to the first voice message on the chatting interface by the user. After the terminal receives the click operation, the microphone is turned on to receive the supplementary voice content input by the user. For example, the user may press and hold the voice bubble, and the interface may present multiple operable options which may include a "supplement voice" option. After the user clicks the "supplement voice" option, the microphone may be automatically turned on to receive a voice input by the user, thus receiving the supplementary voice content.

Figure 1B:
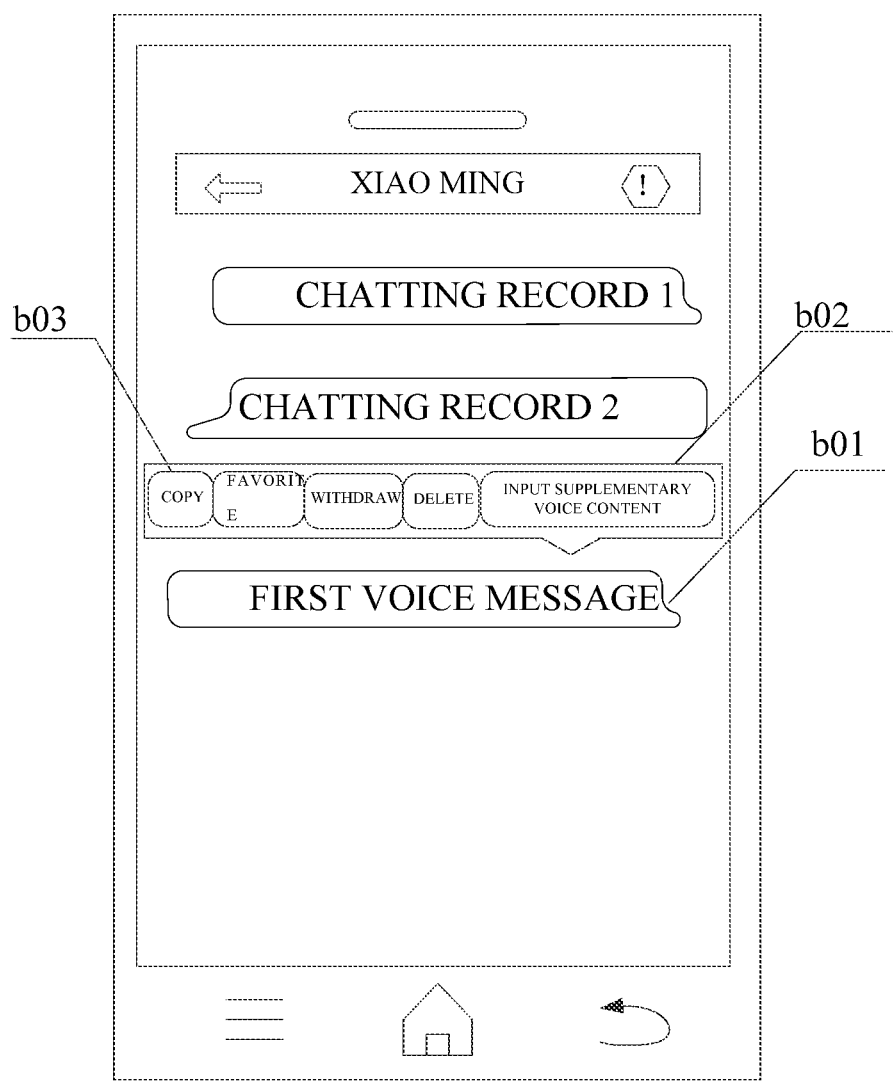
FIG. 1b is a diagram illustrating an interface of a terminal according to an exemplary embodiment.

In an example, as shown in FIG. 1b, when the user presses and holds an icon b01 of the first voice message, the terminal may pop out an operation menu b02 provided with multiple operation options b03 which include "copy", "favorite", "withdraw", "delete", "supplement voice" and so on. The user may click the "supplement voice" option, and then the terminal may instruct to turn on the microphone for receiving a supplementary voice content of the first voice message input by the user. When the user releases his finger, the terminal may instruct to turn off the microphone. It should be noted that, the pressing and holding may be replaced with a single-click, a double-click and so on.

Alternatively, when the user presses and holds the icon of the first voice message, the terminal may also pop out a prompt box displaying texts such as "whether to continue to speak". If the user intends to continue, the terminal may instruct to turn on the microphone for receiving the voice content input by the user.

It should be noted that, in the present embodiment, the first operation instruction may be received in a manner including but not limited to the above manners, which is not specifically limited by the present disclosure. For example, the terminal may be provided with a button, and after the user clicks the button, each chatting message on the interface may be displayed in a selectable state (for example, the message can be checked). The user may determine a message which needs a supplementary voice content by selecting a target chatting content (i.e. the first voice message), and control to turn on the microphone for receiving a supplementary voice content. The above operation may serve as the first operation instruction for instructing the terminal to acquire a supplementary voice content of the first voice message.

Optionally, when the user of the terminal doubts that the voice message may be incomplete and may be difficult for others to read, the user may click (for example with a single click) the voice icon corresponding to the first voice message, to turn on the speaker and play the voice content of the first voice message, in order to manually check whether the first voice message is complete. If the first voice message is incomplete, the user may enter a first operation instruction to input a supplementary voice content. It should be noted that, the judgment of whether the above voice content is complete can be made by the user manually or made by the terminal, which is not specifically limited by the present disclosure.

Optionally, the present manner of the first operation instruction may be an operation with a preset type, for example, double-click, single-click or pressing and holding, which is not limited by the embodiments of the present disclosure.

At block 102, according to the acquired first operation instruction, the supplementary voice content of the first voice message is acquired.

In an example, after the terminal determines that the first operation instruction is received, in response to the first operation instruction, the terminal may instruct the microphone to be turned on. The voice content acquired by the microphone is the supplementary voice content of the first voice message input by the user.

At block 103, according to the supplementary voice content, a second voice message is generated, the second voice message including a supplementary identification indicating that the voice content included in the second voice message is a supplementary voice content.

In an example, after acquiring the supplementary voice content of the first voice message, the terminal can pack the supplementary voice content and the supplementary identification to generate the second voice message. The supplementary identification indicates that the second voice message includes a supplementary voice content.

Generally, a supplementary identification field may be provided in an expanded field of the message head of the second voice message. By writing a preset number into the supplementary identification field, the supplementary identification is added to the second voice message in which the supplementary voice content is included. For example, a conventional voice message (which does not include a supplementary voice content) may carry a head field of the number 0, and a voice message including a supplementary voice content may carry a head field of the number 1.

At block 104, the second voice message is sent to the server.

In an example, the terminal may access a hot point or Wireless-Fidelity (Wi-Fi), and send the second voice message to the server over Internet, or may send the second voice message to the server over a cellular data network, which is not limited by the embodiment of the present disclosure.

Optionally, the user may multiply input different supplementary voice contents of the first voice message. The terminal may generate multiple different voice messages according to the different supplementary voice contents input by the user, and send them to the server.

In the embodiment, after receiving the second voice message sent by the terminal, the server may analyze the supplementary voice content contained in the second voice message, and send the second voice message to the opposite terminal of the above terminal, to implement communication between the terminal and the opposite terminal.

In the technical solution provided by the embodiment of the present disclosure, a terminal may add a supplementary voice content on the basis of the sent voice message according to an instruction of the user. By sending the supplementary voice content carrying the supplementary identification to the server, the server may be instructed to send the supplementary voice content to the opposite terminal. In this embodiment, when the terminal sends a voice message to the opposite terminal, the situation that the opposite terminal receives an incomplete voice message due to network environment reasons or manual reasons can be effectively avoided. Moreover, an opportunity for the user of the terminal to modify the sent voice message is offered, thus improving user experience.

Figure 1C:
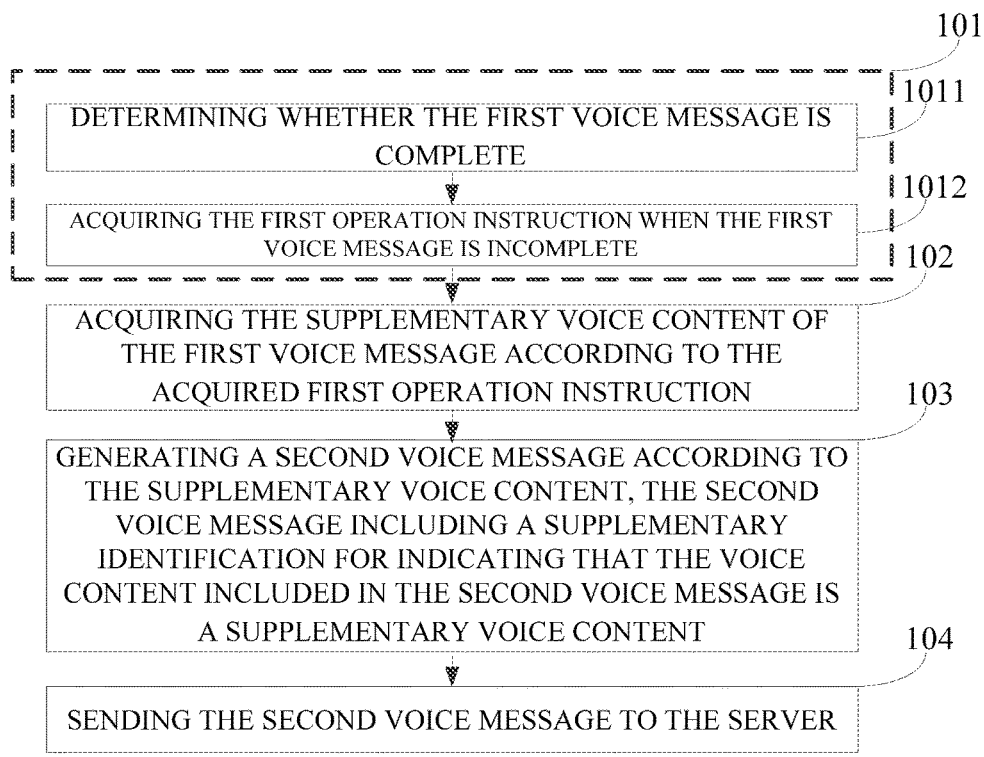
FIG. 1c is a flowchart illustrating a method for voice communication according to an exemplary embodiment.

In an embodiment, as shown in FIG. 1c, block 101 of acquiring a first operation instruction may be implemented through block 1011 and block 1012.

At block 1011, whether the first voice message is complete is determined.

At block 1012, when the first voice message is incomplete, a first operation instruction is acquired.

In the embodiment, whether the first voice message is complete may be determined by the user or may be determined by the terminal. For example, the user may turn on a speaker to hear the sent voice message to determine whether the voice is complete. Alternatively, the terminal may analyze the voice of the sent content to determine whether the sent voice is complete.

In an example, after sending the first voice message, the terminal may acquire a first time duration of the valid voice content in the first voice message, and then compare the first time duration with a preset proportion of a second time duration. The second time duration is a time duration for which the microphone is turned on for generating the first voice message. When the first time duration of the valid voice content in the first voice message is shorter than or equal to the preset proportion of the second time duration, it may be determined that the first voice message is incomplete. The preset proportion may be set according to practical application. In an example, the terminal may compare the first time duration with 30% of the second time duration, and when the first time duration of the valid voice content in the first voice message is shorter than or equal to 30% of the second time duration, the terminal may determine that the first voice message is incomplete. By determining whether the first voice message is complete according to the length of the time duration of the valid voice content in the first voice message, it may improve the accuracy in determining whether the voice message is complete by the terminal and avoid false determination made by the terminal, and improve user experience.

It should be noted that, in the present disclosure, whether the first voice message is complete may be determined in a manner including but not limited to the above manners. In an example, the terminal may divide the voice content included in the first voice message to multiple voice segments. Taking the first voice segment as an example, the terminal may detect the acoustic frequency of the first voice segment. If the acoustic frequency is higher than or equal to a preset threshold, it may indicate that the first voice segment includes a valid voice content. If the acoustic frequency is lower than the preset threshold, it may indicate that the first voice segment is an invalid voice content. The first time duration is the sum of the time durations of the multiple voice segments having valid voice contents.

It should be noted that, in different application situations, the process of determining whether the first voice message is complete may be replaced with a process for determining other contents. For example, it may be determined whether the voice content contained in the first voice message satisfies the intent of the user. Alternatively, it may be determined whether the voice content contained in the first voice message contains dirty words. Alternatively, it may be determined whether the voice content contained in the first voice message is too long or too short. For different application situations, block 1012 may be adjusted accordingly.

In the technical solution provided by the embodiment of the present disclosure, after the first voice message is sent to the server, the terminal may firstly determine whether the first voice message is complete. When the first voice message is incomplete, the terminal acquires a first operation instruction input by the user, to further acquire a supplementary message of the first voice message. In this way, unclear expression caused by adding the supplementary voice content when the first voice message is complete, which causes misguidance or confusion for the user of the opposite terminal receiving the first voice message, may be avoided, thus improving user experience.

Figure 1D:
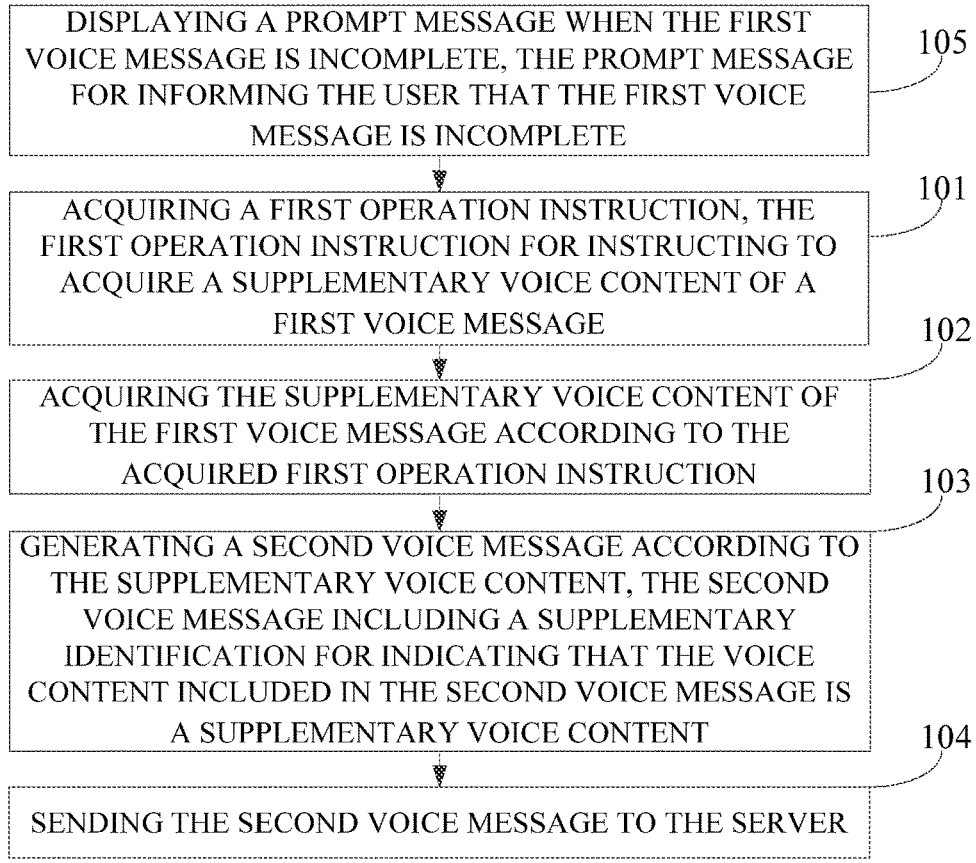
FIG. 1d is a flowchart illustrating a method for voice communication according to an exemplary embodiment.

In an embodiment, as shown in FIG. 1d, the method may also include block 105.

At block 105, when the first voice message is incomplete, a prompt message is displayed, the prompt message for informing the user that the first voice message is incomplete.

In an example, after sending the first voice message, the user may be unaware of whether the first voice message is completely sent out. When the terminal detects that the first voice message is incomplete, a prompt message may be displayed on the display screen. For example, the display screen may display a text "the first voice message is incomplete", to prompt the user to timely input a supplementary voice content of the first voice message.

In the technical solution provided by the embodiment of the present disclosure, when the terminal determines that the first voice message is incomplete, a prompt message may be displayed on the screen to inform the user that the currently input first voice message is incomplete, such that the user may timely instruct the terminal to add a supplementary voice content of the first voice message. In this way, it may ensure the completeness of the voice message sent to the opposite terminal, and it may avoid misguidance and confusion caused by the incompleteness of the voice message to the user of the opposite terminal, thus improving user experience.

Figure 1E:
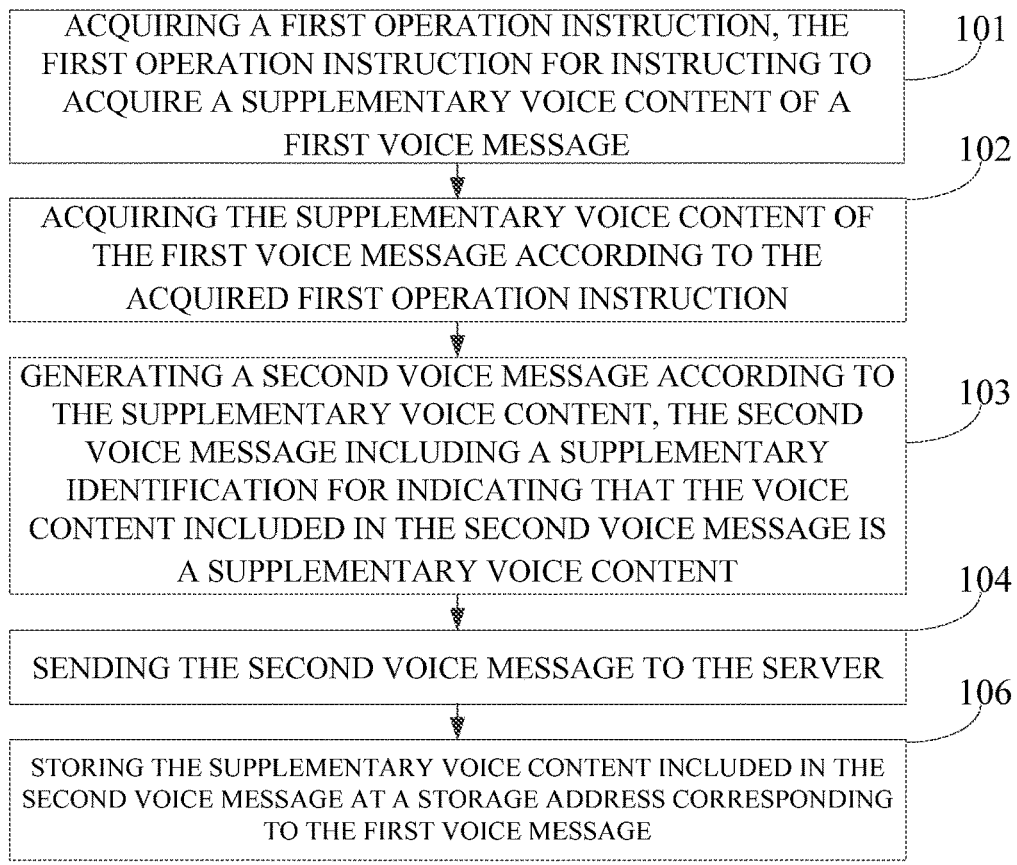
FIG. 1e is a flowchart illustrating a method for voice communication according to an exemplary embodiment.

In an embodiment, as shown in FIG. 1e, the method may also include block 106.

At block 106, the supplementary voice content included in the second voice message is stored at a storage address corresponding to the first voice message.

In an example, the first voice message and the supplementary voice content of the first voice message included in the second voice message may be successively stored at the storage address corresponding to the first voice message according to the acquiring time order. When sending the voice messages, the terminal may send the voice messages successively according to the storing order. That is, first sending the voice message stored firstly, and then sending the voice message stored subsequently.

Alternatively, in order to save the memory of the terminal, when the first voice message has been sent out, it is also possible that the first voice message is overwritten by the supplementary voice content of the first voice message included in the second voice message.

Correspondingly, when receiving the supplementary voice content sent by the terminal (via the server), the opposite terminal stores the acquired supplementary voice content and the acquired first voice message at the same storage address. On the interface of the opposite terminal, the first voice message and the supplementary voice content may be presented as corresponding to the same voice icon (for example, a voice bubble). In fact, in this case, for the user of the opposite terminal, the first voice message and the supplementary voice content have been merged to one piece of message (or, the supplementary voice content has replaced the voice content contained in the first voice message).

The above embodiment is also suitable to the technical solution as shown in FIGS. 1c and 1d.

In the technical solution provided by the embodiment of the present disclosure, the second voice message including the supplementary voice content of the first voice message is stored at a storage address corresponding to the first voice message. In this way, it may ensure the correlation between the first voice message and the second voice message, and facilitate the user to read the complete voice message.

Figure 2A:
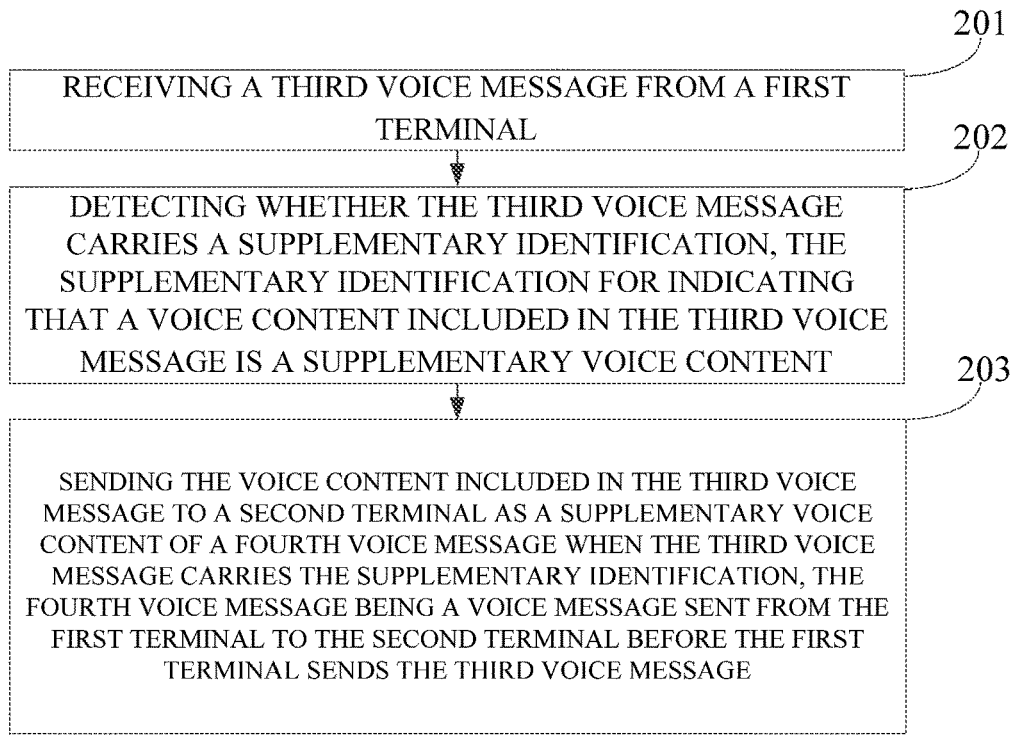
FIG. 2a is a flowchart illustrating a method for voice communication according to an exemplary embodiment.

FIG. 2a is a flowchart illustrating a method for voice communication according to an exemplary embodiment. As shown in FIG. 2, the method for voice communication includes the following blocks 201-203.

At block 201, a third voice message is received from a first terminal.

In an example, the server may receive the third voice message sent from the first terminal over the Internet, or may receive the third voice message sent from the first terminal over the cellular data network, which is not limited by the embodiment of the present disclosure.

At block 202, whether the third voice message carries a supplementary identification is detected, the supplementary identification for indicating the voice content included in the third voice message is a supplementary voice content.

In an example, after receiving the third voice message, the terminal may analyze the third voice message, to determine whether the third voice message includes a supplementary identification. The supplementary identification may be provided in an expanded field of the message head of the third voice message. By writing a preset number in the supplementary identification field, the supplementary identification is added to the third voice message in which the supplementary voice content is included. For example, a conventional voice message (which does not include a supplementary voice content) may carry a head field of the number 0, and a voice message including a supplementary voice content may carry a head field of the number 1. When the server analyzes that the head field of the third voice message is the number 1, it may be determined that the third voice message carries a supplementary identification. That is, it may be determined that the voice content included in the third voice message is a supplementary voice content.

It should be noted that, the above supplementary identification may be carried in a manner including but not limited to the above manners, and any manner that can identify a voice message being a supplementary voice content is in the protective scope of the present disclosure, and this is not limited by the present disclosure.

At block 203, when the third voice message carries a supplementary identification, the voice content included in the third voice message is sent to a second terminal as a supplementary voice content of a fourth voice message, the fourth voice message being a voice message sent from the first terminal to the second terminal before the first terminal sends the third voice message.

In an example, if the third voice message carries a supplementary identification, the server may send the supplementary voice content to the second terminal to append the supplementary voice content to the voice content of the fourth voice message.

Taking the voice content included in the third voice message as a supplementary voice content of a fourth voice message includes but is not limited to: (1) replacing the voice content included in the fourth voice message with the voice content (i.e. the supplementary voice content) included in the third voice message, that is, withdrawing the fourth voice message; optionally, storing the supplementary voice content at the storage address where the fourth voice message was stored; (2) appending the voice content included in the third voice message to the end of the voice content included in the fourth voice message, as both corresponding to the same voice icon (such as a voice bubble), that is, stored at the same storage address (for example the storage address of the fourth voice message), with the newly generated voice content including the voice content included in the third voice message and the voice content included in the fourth voice message; and (3) arranging the voice content included in the third voice message at the end of the voice content included in the fourth voice message, but as corresponding to different voice icons, that is, stored at different addresses, with a connection (such as a dash line) being established between the two voice icons to notice the user of the terminal.

Optionally, if the third voice message carries a supplementary identification, the server may withdraw the fourth voice message sent to the second terminal, and then acquire the voice content of the fourth voice message. After appending the supplementary voice content of the third voice message to the end of the voice content of the fourth voice message, the server packs to generate a fifth voice message and sends the fifth voice message to the second terminal. In the embodiment, it may ensure the consistency of the voice message and improve the listening effect of the user.

Alternatively, if the third voice message carries a supplementary identification, it is also possible that the server directly acquires the voice content of the fourth voice message from a local storage without withdrawing the fourth voice message, and then after appending the supplementary voice content of the third voice message to the end of the voice content of the fourth voice message, packs to generate a fifth voice message and sends the fifth voice message to the second terminal.

Alternatively, if the third voice message carries a supplementary identification, it is also possible that the server directly sends the supplementary voice content of the third voice message to the second terminal without withdrawing the fourth voice message, and instructs the second terminal to append the supplementary voice content to the end of the voice content of the fourth voice message.

In the technical solution provided by the embodiment of the present disclosure, the server may send the voice content of the third voice message as the supplementary voice content of the fourth voice message to the second terminal, which ensures the completeness of the voice message sent to the second terminal and avoids misguidance or confusion to the user of the second terminal caused by an incomplete voice message, thus improving user experience.

Figure 2B:
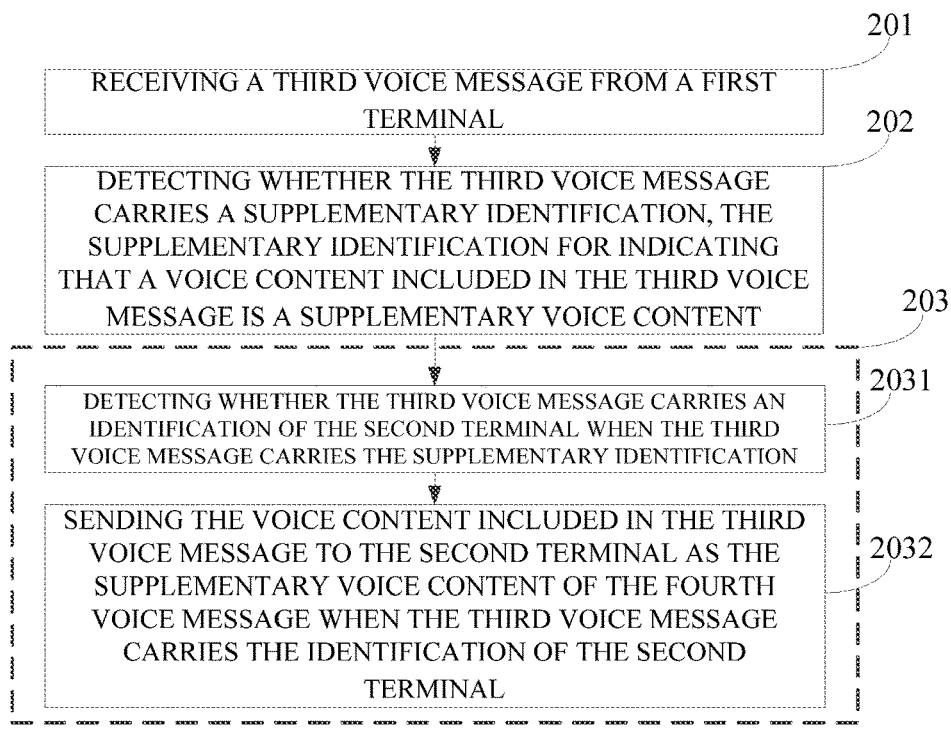
FIG. 2b is a flowchart illustrating a method for voice communication according to an exemplary embodiment.

In one embodiment, as shown in FIG. 2b, at block 203, if the third voice message carries a supplementary identification, sending the voice content included in the third voice message to the second terminal as the supplementary voice content of the fourth voice message may be implemented through block 2031 and block 2032.

At block 2031, if the third voice message carries a supplementary identification, whether the third voice message carries an identification of the second terminal is detected, the identification of the second terminal for uniquely identifying the second terminal.

At block 2032, if the third voice message carries the identification of the second terminal, the voice content included in the third voice message is sent to the second terminal as the supplementary voice content of the fourth voice message.

In an example, the identification of the second terminal mentioned in the embodiment is configured to instruct sending the voice content included in the third voice message to the second terminal. For example, in default situation, the server appends the received supplementary voice content to the last message received previously (that is the above fourth voice message). In this case, when it is detected that the third voice message carries a supplementary identification and the identification of the second terminal, the sever sends the voice content included in the third voice message to the second terminal, and appends the voice content included in the third voice message to the last voice message received by the second terminal.

In the embodiment, the server may determine to which terminal the supplementary voice content is to be sent according to a terminal identification carried by the voice message, thus ensuring the accuracy of the sending object and avoiding false determination made by the server.

Figure 2C:
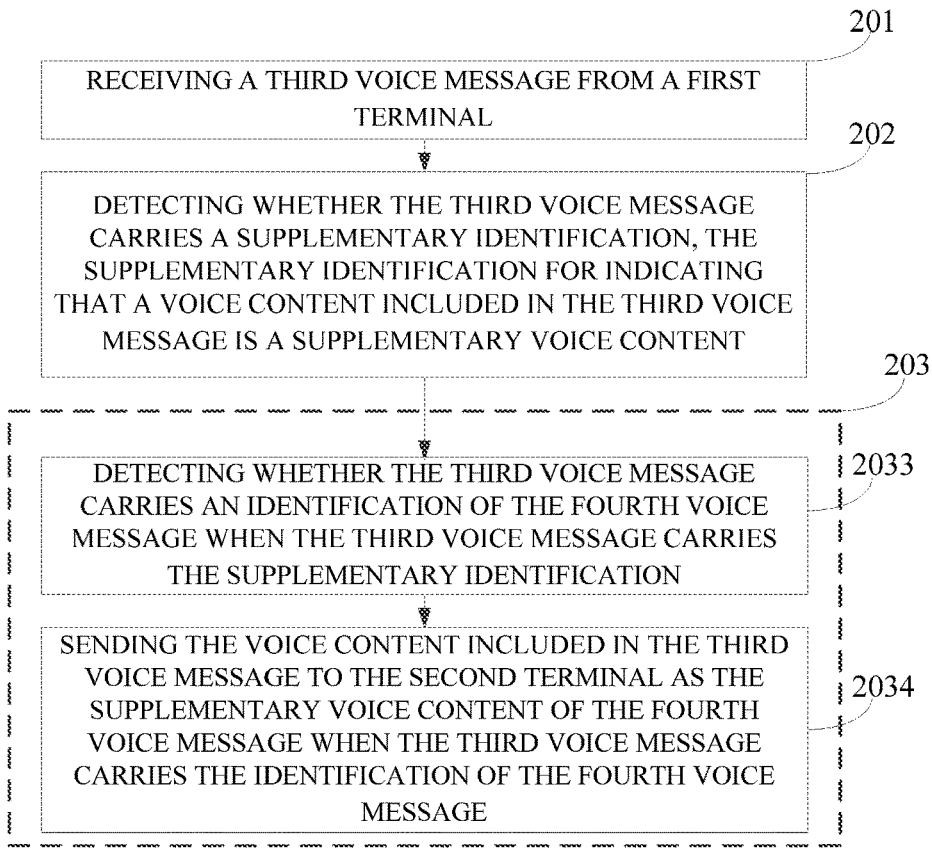
FIG. 2c is a flowchart illustrating a method for voice communication according to an exemplary embodiment.

In one embodiment, as shown in FIG. 2c, at block 203, if the third voice message carries a supplementary identification, sending the voice content included in the third voice message to the second terminal as the supplementary voice content of the fourth voice message may be implemented through block 2033 and block 2034.

At block 2033, if the third voice message carries a supplementary identification, whether the third voice message carries an identification of the fourth voice message is detected, the identification of the fourth voice message uniquely identifying the fourth voice message.

At block 2034, if the third voice message carries the identification of the fourth voice message, the voice content included in the third voice message is sent to the second terminal as the supplementary voice content of the fourth voice message.

In an example, the identification of the fourth voice message mentioned in the embodiment is configured to instruct appending the voice content included in the third voice message to the fourth voice message. For example, in default situation, the server sends the voice to all the terminals (or to the default terminal) to which the server has sent messages in a preset time period. In this case, when it is detected that the third voice message carries a supplementary identification and the identification of the fourth voice message, the server sends the supplementary voice content included in the third voice message to all the terminals (or to the default terminal) and appends to the fourth voice message of the corresponding terminal.

In the technical solution provided by the embodiment of the present disclosure, the server may determine to which voice message the supplementary voice content is to be appended according to the voice-message identification carried by the voice message, which may ensure the accuracy in determining an object to append the voice, and avoid false determination made by the server.

In an embodiment, when withdrawing the fourth voice message, the server may firstly determine whether a read feedback message of the fourth voice message indicating that the fourth message has been read by the user is received from the second terminal. If no read feedback message of the fourth voice message is received from the second terminal, the fourth voice message is withdrawn.

In an example, after the user has clicked and listened to a voice message, the terminal may send a read feedback message of the voice message to the server, to inform the server the voice message has been read. In the embodiment, when the voice message has not been read by the user, the voice message may be withdrawn. It may take the feeling of the user of the message receiving terminal into consideration, which saves message reading time for the user and improves the reading efficiency.

In addition, optionally, when the server determines that the third voice message includes the supplementary voice content of the fourth voice message, if the read feedback message of the fourth voice message is received from the second terminal, the server may send a prompt message to the second terminal informing the user that the fourth voice message is an incomplete voice message. Then the server may send the complete voice content which has been processed to the second terminal.

In the embodiment, when the voice message has not been read by the user, the voice message may be withdrawn. In this way, it may take the feeling of the user of the message receiving terminal into consideration, thus saving message reading time for the user and improves the reading efficiency.

Figure 3:
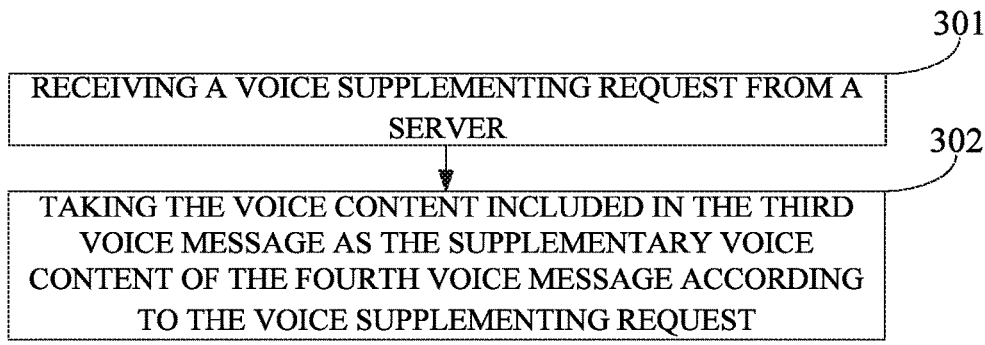
FIG. 3 is a flowchart illustrating a method for voice communication according to an exemplary embodiment.

FIG. 3 is a flowchart illustrating a method for voice communication according to an exemplary embodiment. As shown in FIG. 3, the method for voice communication includes the following blocks 301-302.

At block 301, a voice supplementing request is received from a server.

In the embodiment, the voice supplementing request requests taking the voice content included in the third voice message as the supplementary voice content of the fourth voice message. The fourth voice message is a voice message received before the third voice message is received. The voice supplementing request carries the third voice message, a supplementary identification and an identification of the fourth voice message. The supplementary identification indicates that the voice content included in the third voice message is a supplementary voice content. The identification of the fourth voice message uniquely identifies the fourth voice message.

In an example, after receiving the voice supplementing request from the server, the terminal firstly analyzes the voice supplementing request, to acquire the information included in the voice supplementing request, then determines the voice content included in the third voice message included in the voice supplementing request is the supplementary voice content of the fourth voice message according to the supplementary identification and the identification of the fourth voice message included in the voice supplementing request. At this time, the terminal may store the voice content included in the third voice message to the storage address where the fourth voice message is stored.

At block 302, according to the voice supplementing request, the voice content included in the third voice message is taken as the supplementary voice content of the fourth voice message.

In an example, after the terminal determines that the voice content included in the third voice message included in the voice supplementing request is the supplementary voice content of the fourth voice message, if the user has not read the fourth voice message, the terminal may incorporate the voice content of the fourth voice message and the voice content included in the third voice message into a complete voice message, and represent the complete voice message on the screen of the terminal with a voice icon. If the user has read the fourth voice message, the terminal may incorporate the voice content of the fourth voice message and the voice content included in the third voice message into a complete voice message, then represent the complete voice message with the original voice icon of the fourth voice message on the screen of the terminal, and mark the voice icon as unread. Alternatively, after the voice content of the fourth voice message and the voice content included in the third voice message are incorporated into a complete voice message, the complete voice message is presented on the screen of the terminal with a new voice icon, and a connection between the new voice icon and the voice icon of the fourth voice message is displayed. For example, a dash line connecting the new voice icon and the voice icon of the fourth voice message may be displayed, to facilitate the user to understand the relation between the two voice messages.

In the technical solution provided by the present disclosure, when it is determined that the received voice message is the supplementary voice content of another voice message, the terminal may append the supplementary voice content to the end of the incomplete voice message and feed back to the user, which may avoid the misguidance and confusion to the user of the terminal caused by the incomplete voice message received due to network environment or artificial reasons, thus improving user experience.

The implementation of the method will be described in detail with reference to some embodiments below.

Figure 4:
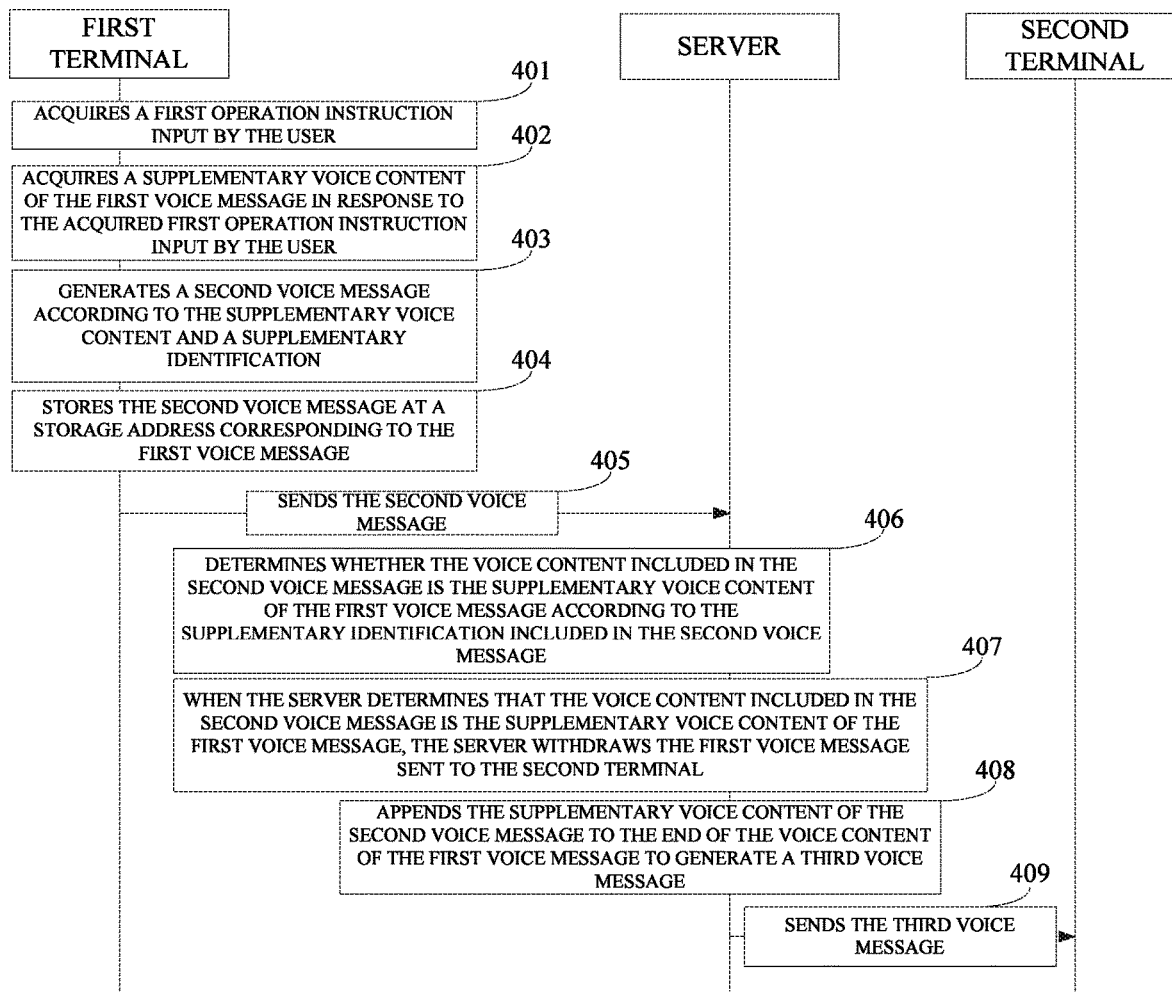
FIG. 4 is an interaction diagram illustrating a method for voice communication according to an exemplary embodiment.

FIG. 4 is an interaction diagram illustrating a method for voice communication according to an exemplary embodiment, which may be applied to a system composed of terminals and a server. The terminal may be a mobile phone, a tablet computer, a smart watch or other device which is capable of voice communication. The server may be a server provided by an operator, or a server provided by a third party, which is not limited by the embodiments of the present disclosure. As shown in FIG. 4, the method for voice communication includes the following block 401 to block 409.

At block 401, the first terminal acquires a first operation instruction input by the user.

At block 402, the first terminal acquires a supplementary voice content of the first voice message in response to the acquired first operation instruction input by the user.

At block 403, the first terminal generates a second voice message according to the supplementary voice content and a supplementary identification.

At block 404, the first terminal stores the second voice message at a storage address corresponding to the first voice message.

At block 405, the first terminal sends the second voice message to the server.

At block 406, the server determines whether the voice content included in the second voice message is the supplementary voice content of the first voice message according to the supplementary identification included in the second voice message.

At block 407, when the server determines that the voice content included in the second voice message is the supplementary voice content of the first voice message, the server withdraws the first voice message sent to the second terminal.

When the voice content included in the second voice message is not the supplementary voice content of the first voice message, the server sends the second voice message to the second terminal.

At block 408, the server appends the supplementary voice content of the second voice message to the end of the voice content of the first voice message to generate a third voice message.

At block 409, the server sends the third voice message to the second terminal.

In the embodiment of the present disclosure, the terminal may add a supplementary voice content on the basis of the sent voice message according to an instruction of the user. By sending the supplementary voice content carries the supplementary identification to the server, the server may be instructed to send the supplementary voice content to the opposite terminal. In this embodiment, when the terminal sends a voice message to the opposite terminal, the situation that the opposite terminal receives an incomplete voice message due to reasons from the network environment or the user may be effectively avoided. Moreover, an opportunity for the user of the terminal to modify the sent voice message is offered, thus improving user experience.

Figure 5:
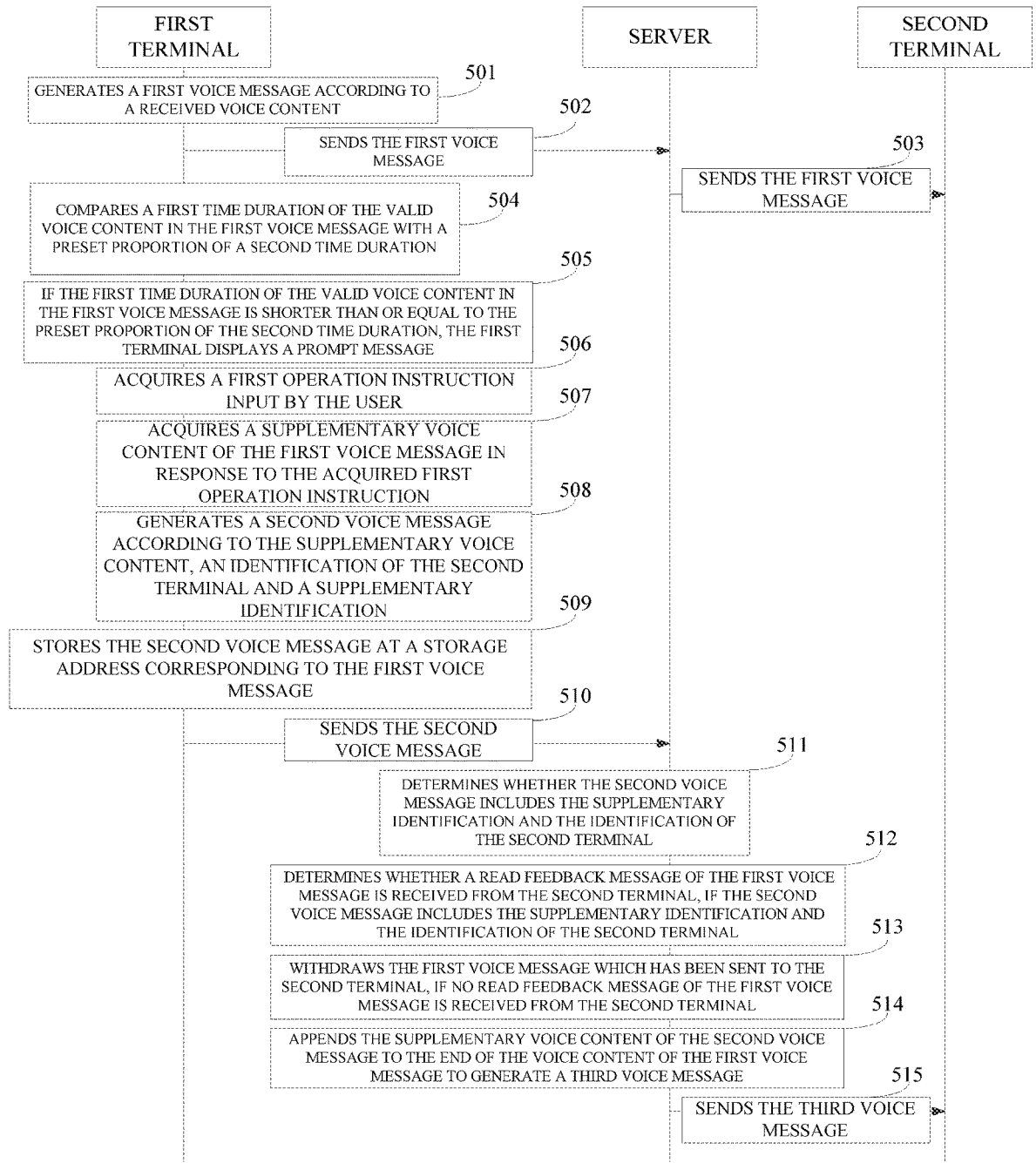
FIG. 5 is an interaction diagram illustrating a method for voice communication according to an exemplary embodiment.

FIG. 5 is an interaction diagram illustrating a method for voice communication according to an exemplary embodiment, which may be applied to a system composed of terminals and a server. The terminal may be a mobile phone, a tablet computer, a smart watch or other device which is capable of voice communication. The server may be a server provided by an operator, or a server provided by a third party, which is not limited by the embodiments of the present disclosure. As shown in FIG. 5, the method for voice communication includes the following block 501 to block 515.

At block 501, the first terminal generates a first voice message according to a received voice content.

At block 502, the first terminal sends the first voice message to the server.

At block 503, the server forwards the first voice message to the second terminal.

At block 504, the first terminal compares a first time duration of the valid voice content in the first voice message with a preset proportion of a second time duration, the second time duration being a time duration for which the microphone is turned on for generating the first voice message.

At block 505, if the first time duration of the valid voice content in the first voice message is shorter than or equal to the preset proportion of the second time duration, the first terminal displays a prompt message.

In the embodiment, if the first time duration of the valid voice content in the first voice message is shorter than or equal to the preset proportion of the second time duration, the first terminal may determine that the first voice message is incomplete.

If the first time duration of the valid voice content in the first voice message is longer than the preset proportion of the second time duration, the first terminal may determine that the first voice message is complete.

At block 506, the first terminal acquires a first operation instruction input by the user.

At block 507, the first terminal acquires a supplementary voice content of the first voice message in response to the acquired first operation instruction.

At block 508, the first terminal generates a second voice message according to the supplementary voice content, an identification of the second terminal and a supplementary identification.

At block 509, the first terminal stores the second voice message at a storage address corresponding to the first voice message.

At block 510, the first terminal sends the second voice message to the server.

At block 511, the server determines whether the second voice message includes the supplementary identification and the identification of the second terminal.

At block 512, if the second voice message includes the supplementary identification and the identification of the second terminal, the server determines whether a read feedback message of the first voice message is received from the second terminal.

At block 513, if no read feedback message of the first voice message is received from the second terminal, the server withdraws the first voice message which has been sent to the second terminal.

At block 514, the server appends the supplementary voice content of the second voice message to the end of the voice content of the first voice message to generate a third voice message.

At block 515, the server sends the third voice message to the second terminal.

In the embodiment of the present disclosure, the terminal may add a supplementary voice content on the basis of the sent voice message according to an instruction of the user. By sending the supplementary voice content carried with the supplementary identification to the server, the server may be instructed to send the supplementary voice content to the opposite terminal. In this embodiment, when the terminal sends a voice message to the opposite terminal, the situation that the opposite terminal receives an incomplete voice message due to reasons from the network environment or the user may be effectively avoided. Moreover, an opportunity for the user of the terminal to modify the sent voice message is offered, thus improving user experience.

The following are device embodiments of the present disclosure which may perform the above method embodiments of the present disclosure.

Figure 6A:
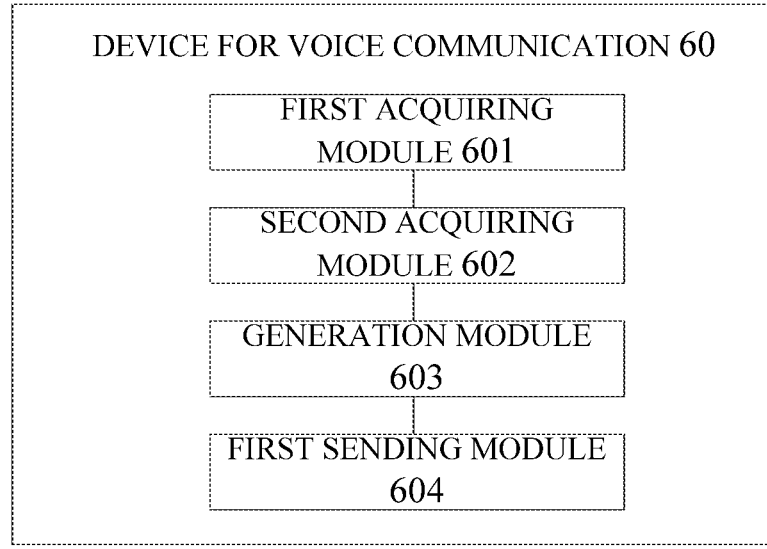
FIG. 6a is a block diagram illustrating the construction of a device for voice communication according to an exemplary embodiment.

FIG. 6*a* is a block diagram illustrating the construction of a device 60 for voice communication according to an exemplary embodiment. The device 60 may be implemented as a part or the whole of an electronic device through software, hardware or combination of the both. As shown in FIG. 6*a*, the device 60 for voice communication includes a first acquiring module 601, a second acquiring module 602, a generation module 603 and a first sending module 604.

The first acquiring module 601 is configured to acquire a first operation instruction, the first operation instruction for instructing to acquire a supplementary voice content of a first voice message.

The second acquiring module 602 is configured to acquire the supplementary voice content of the first voice message according to the first operation instruction.

The generation module 603 is configured to generate a second voice message according to the supplementary voice content and a supplementary identification, the supplementary identification for indicating that the voice content included in the second voice message is a supplementary voice content.

The first sending module 604 is configured to send the second voice message to the server.

Figure 6B:
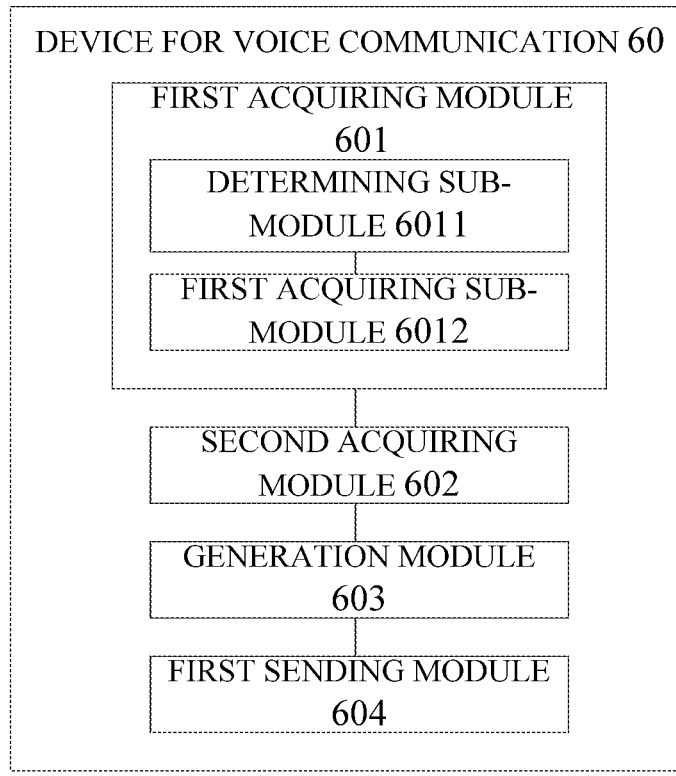
FIG. 6b is a block diagram illustrating the construction of a device for voice communication according to an exemplary embodiment.

In an embodiment, as shown in FIG. 6*b*, the first acquiring module 601 includes a determining sub-module 6011 and a first acquiring sub-module 6012.

The determining sub-module 6011 is configured to determine whether the first voice message is complete.

The first acquiring sub-module 6012 is configured to acquire the first operation instruction when the first voice message is incomplete.

Figure 6C:
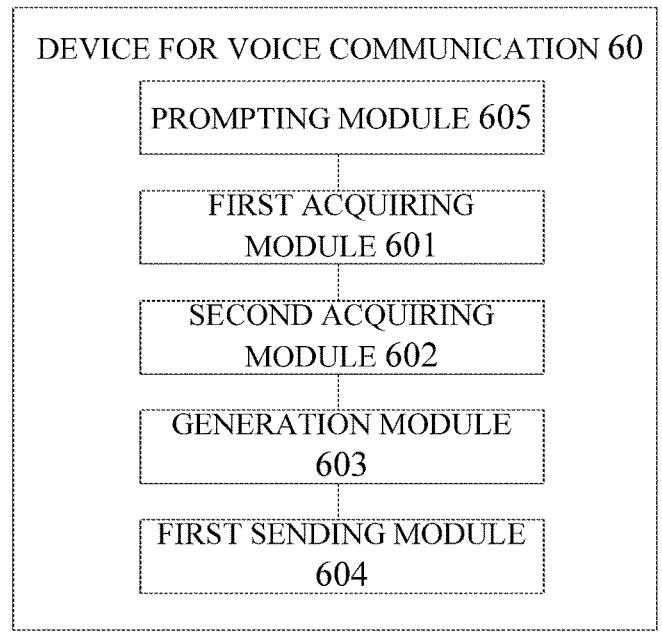
FIG. 6c is a block diagram illustrating the construction of a device for voice communication according to an exemplary embodiment.

In an embodiment, as shown in FIG. 6*c*, the device 60 also includes a prompting module 605.

The prompting module 605 is configured to display a prompt message when the first voice message is incomplete, the prompt message for informing the user that the first voice message is incomplete.

Figure 6D:
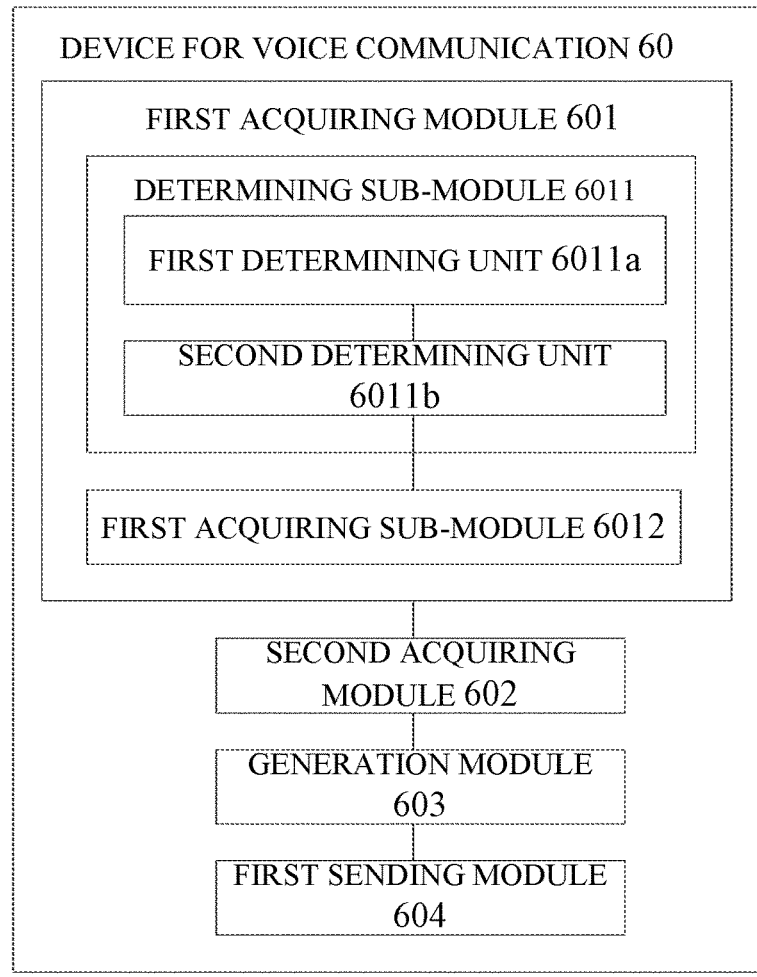
FIG. 6d is a block diagram illustrating the construction of a device for voice communication according to an exemplary embodiment.

In an embodiment, as shown in FIG. 6*d*, the determining sub-module 6011 includes a first determining unit 6011*a* and a second determining unit 6011*b*.

The first determining unit 6011*a* is configured to compare a first time duration of a valid voice content in the first voice message with a preset proportion of a second time duration, the second time duration being a time duration for which a microphone is turned on for generating the first voice message.

The second determining unit 6011*b* is configured to determine that the first voice message is incomplete when the first time duration of the valid voice content in the first voice message is shorter than or equal to the preset proportion of the second time duration.

The above embodiment also applies to the device 60 for voice communication as shown in FIG. 6*b*.

Figure 6E:
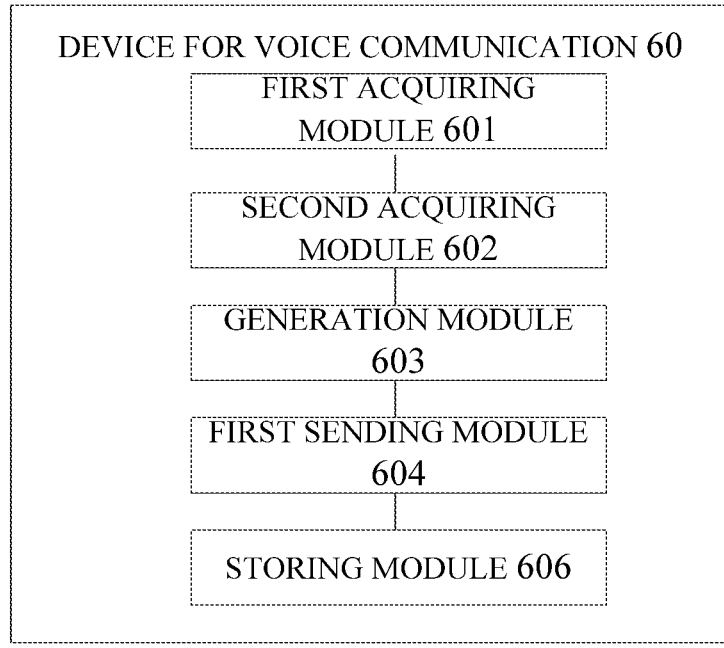
FIG. 6e is a block diagram illustrating the construction of a device for voice communication according to an exemplary embodiment.

In an embodiment, as shown in FIG. 6*e*, the device 60 also includes a storing module 606.

The storing module 606 is configured to store the supplementary voice content at a storage address corresponding to the first voice message.

The above embodiment also applies to the devices 60 for voice communication as shown in FIG. 6*b*, FIG. 6*c* and FIG. 6*d*.

Figure 6F:
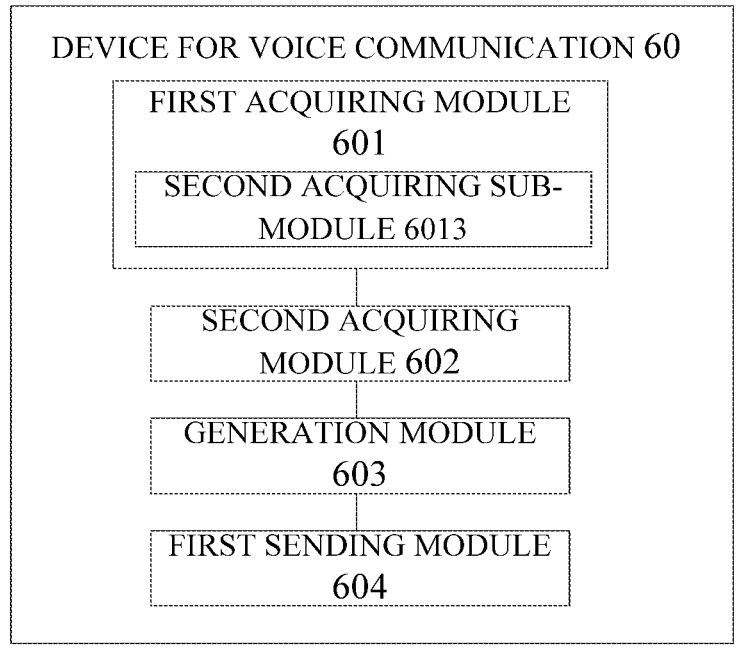
FIG. 6f is a block diagram illustrating the construction of a device for voice communication according to an exemplary embodiment.

In an embodiment, as shown in FIG. 6*f*, the first acquiring module 601 includes a second acquiring sub-module 6013 configured to acquire the first operation instruction through a voice icon corresponding to the first voice message on a user interface.

A device for voice communication is provided by the embodiments of the present disclosure. The device may add a supplementary voice content on the basis of the sent voice message according to an instruction of the user. By sending the supplementary voice content carried with the supplementary identification to the server, the server may be instructed to send the supplementary voice content to the opposite device. In this embodiment, when the device sends a voice message to the opposite device, the situation that the opposite device receives an incomplete voice message due to reasons from the network environment or the user may be effectively avoided. Moreover, an opportunity for the user of the device to modify the sent voice message is offered, thus improving user experience.

Figure 7A:
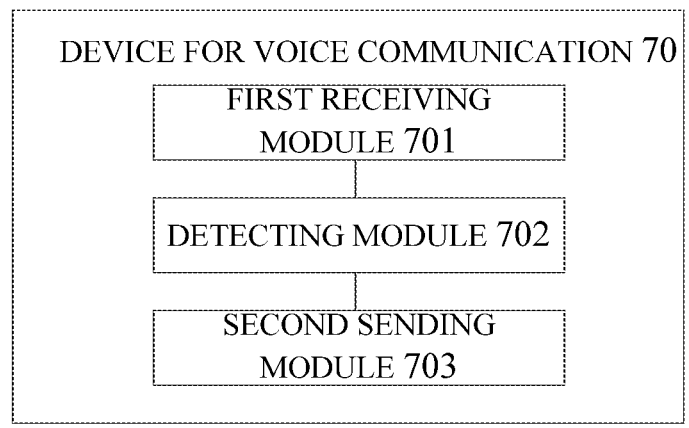
FIG. 7a is a block diagram illustrating the construction of a device for voice communication according to an exemplary embodiment.

FIG. 7*a* is a block diagram illustrating the construction of a device 70 for voice communication according to an exemplary embodiment. The device 70 may be implemented as a part or the whole of an electronic device through software, hardware or combination of the both. As shown in FIG. 7*a*, the device 70 for voice communication includes a first receiving module 701, a detecting module 702 and a second sending module 703.

The first receiving module 701 is configured to receive a third voice message from a first terminal.

The detecting module 702 is configured to detect whether the third voice message carries a supplementary identification, the supplementary identification for indicating that a voice content included in the third voice message is a supplementary voice content.

The second sending module 703 is configured to send the voice content included in the third voice message to a second terminal as a supplementary voice content of a fourth voice message when the third voice message carries the supplementary identification, the fourth voice message being a voice message sent to the second terminal before the first terminal sends the third voice message.

Figure 7B:
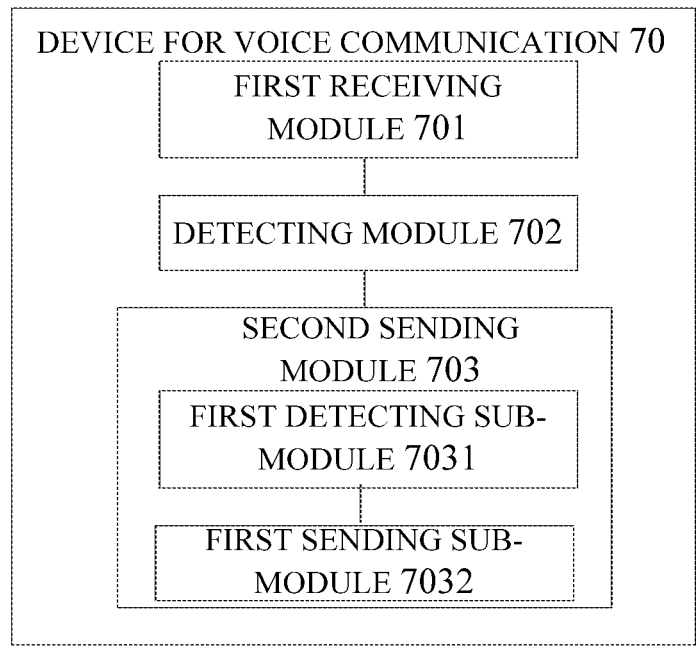
FIG. 7b is a block diagram illustrating the construction of a device for voice communication according to an exemplary embodiment.

In an embodiment, as shown in FIG. 7*b*, the second sending module 703 includes a first detecting sub-module 7031 and a first sending sub-module 7032.

The first detecting sub-module 7031 is configured to detect whether the third voice message carries an identification of the second terminal when the third voice message carries the supplementary identification, the identification of the second terminal for uniquely identifying the second terminal.

The first sending sub-module 7032 is configured to send the voice content included in the third voice message to the second terminal as the supplementary voice content of the fourth voice message when the third voice message carries the identification of the second terminal.

Figure 7C:
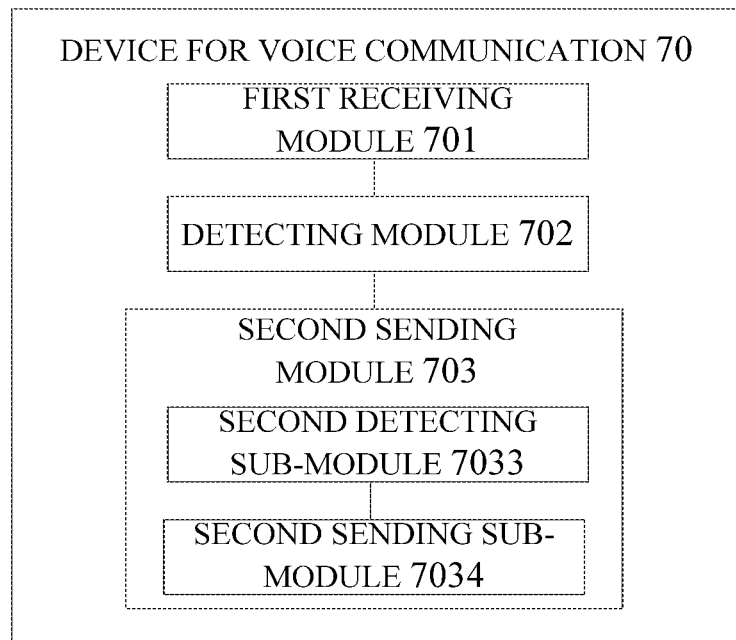
FIG. 7c is a block diagram illustrating the construction of a device for voice communication according to an exemplary embodiment.

In an embodiment, as shown in FIG. 7c, the second sending module 703 also includes a second detecting sub-module 7033 and a second sending sub-module 7034.

The second detecting sub-module 7033 is configured to detect whether the third voice message carries an identification of the fourth voice message when the third voice message carries the supplementary identification, the identification of the fourth voice message for uniquely identifying the fourth voice message.

The second sending sub-module 7034 is configured to send the voice content included in the third voice message to the second terminal as the supplementary voice content of the fourth voice message when the third voice message carries the identification of the fourth voice message.

The above embodiment also applies to the device 70 for voice communication as shown in FIG. 7b.

Figure 7D:
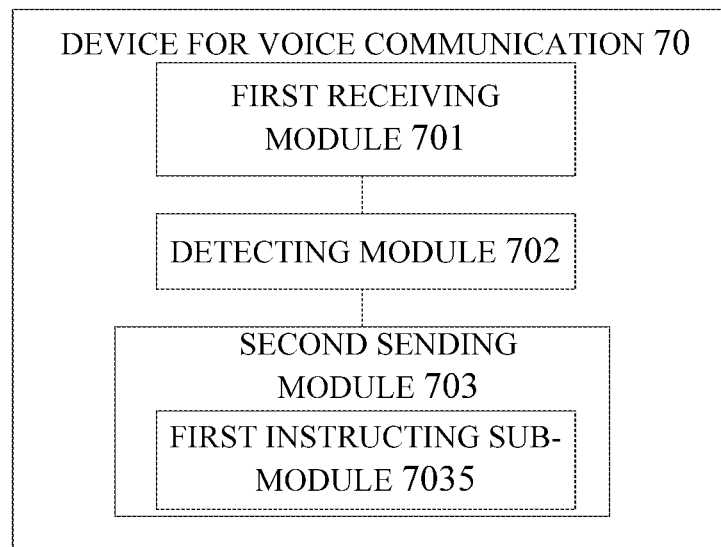
FIG. 7d is a block diagram illustrating the construction of a device for voice communication according to an exemplary embodiment.

In an embodiment, as shown in FIG. 7d, the second sending module 703 includes a first instructing sub-module 7035.

The first instructing sub-module 7035 is configured to instruct the second terminal to store the voice content included in the third voice message at a storage address where the fourth voice message is and withdraw the fourth voice message.

Figure 7E:
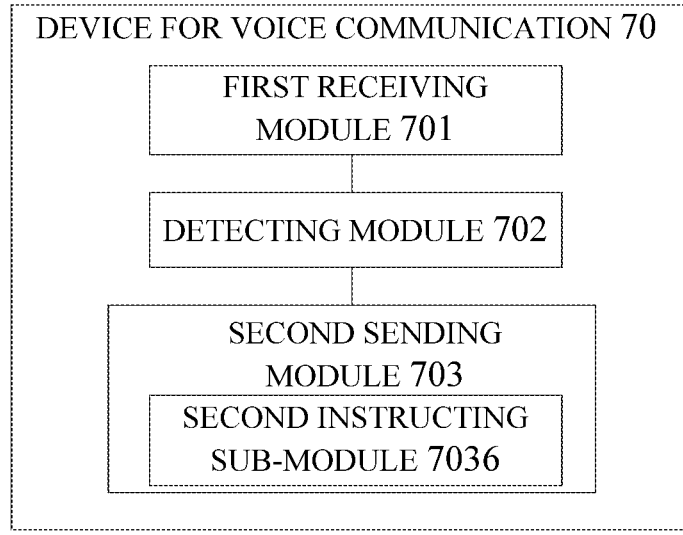
FIG. 7e is a block diagram illustrating the construction of a device for voice communication according to an exemplary embodiment.

Alternatively, as shown in FIG. 7e, the second sending module 703 includes a second instructing sub-module 7036.

The second instructing sub-module 7036 is configured to instruct the second terminal to append the voice content included in the third voice message to the end of the voice content included in the fourth voice message.

The above embodiment also applies to the devices 70 for voice communication as shown in FIG. 7b and FIG. 7c.

Figure 7F:
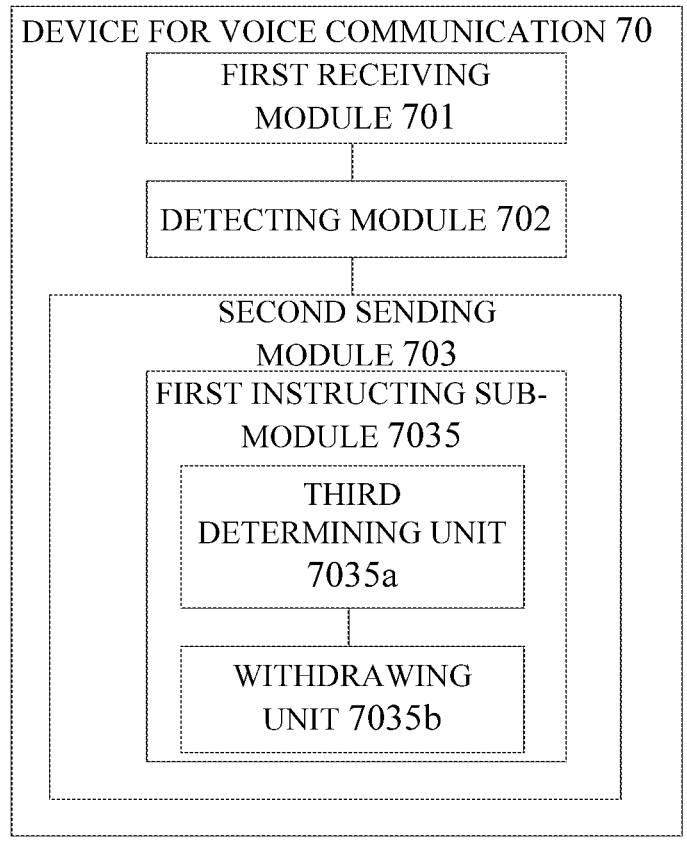
FIG. 7f is a block diagram illustrating the construction of a device for voice communication according to an exemplary embodiment.

In an embodiment, as shown in FIG. 7f, the first instructing sub-module 7035 includes a third determining unit 7035a and a withdrawing unit 7035b.

The third determining unit 7035a is configured to determine whether a read feedback message of the fourth voice message is received from the second terminal.

The withdrawing unit 7035b is configured to withdraw the fourth voice message when no read feedback message of the fourth voice message is received from the second terminal.

A device for voice communication is provided by the embodiments of the present disclosure. The device may send a voice content of a voice message as a supplementary voice content of another voice message to a terminal, which ensures the completeness of the voice message received by the terminal, and avoids misguidance or confusion to the user of the terminal caused by an incomplete voice message received at the terminal due to reasons from the network environment or the user, thus improving user experience.

Figure 8:
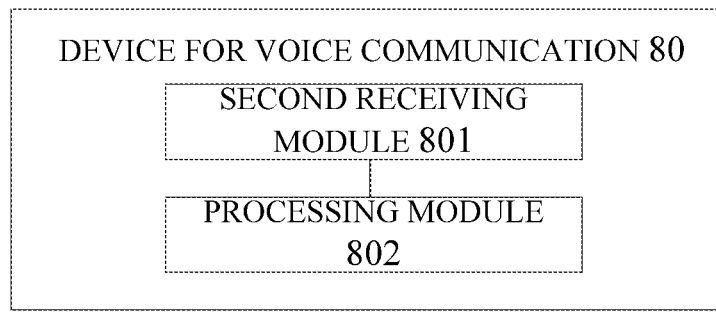
FIG. 8 is a block diagram illustrating the construction of a device for voice communication according to an exemplary embodiment.

FIG. 8 is a block diagram illustrating the construction of a device 80 for voice communication according to an exemplary embodiment. The device 80 may be implemented as a part or the whole of an electronic device through software, hardware or combination of the both. As shown in FIG. 8, the device 80 for voice communication includes a second receiving module 801 and a processing module 802.

The second receiving module 801 is configured to receive a voice supplementing request from a server, the voice supplementing request for requesting taking a voice content included in a third voice message as a supplementary voice content of a fourth voice message, the fourth voice message being a voice message received before the third voice message is received, the voice supplementing request carrying the third voice message, a supplementary identification and an identification of the fourth voice message, the supplementary identification for indicating that the voice content included in the third voice message is a supplementary voice content, and the identification of the fourth voice message for uniquely identifying the fourth voice message.

The processing module 802 is configured to take the voice content included in the third voice message as the supplementary voice content of the fourth voice message according to the voice supplementing request.

A device for voice communication is provided by the embodiments of the present disclosure. When it is determined that the received voice message is the supplementary voice content of another voice message, the device may append the supplementary voice content to the end of the incomplete voice message and feed back to the user, which avoids the misguidance and confusion to the user of the terminal caused by the incomplete voice message received at the terminal due to reasons from the network environment or the user, thus improving user experience.

An embodiment of the present disclosure provides a system for voice communication, including the device 60 for voice communication as shown in any one of FIGS. 6a-6f, the device 70 for voice communication as shown in any one of FIGS. 7a-7f, and the device 80 for voice communication as shown FIG. 8.

An embodiment of the present disclosure provides a device for voice communication, including:
a first processor;
a first memory for storing instructions executable by the first processor;
wherein the first processor is configured to:
acquire a first operation instruction, the first operation instruction for instructing to acquire a supplementary voice content of a first voice message;
acquire the supplementary voice content of the first voice message according to the acquired first operation instruction;
generate a second voice message according to the supplementary voice content, the second voice message including a supplementary identification for indicating that the voice content included in the second voice message is a supplementary voice content; and
send the second voice message to a server.

An embodiment of the present disclosure provides a device for voice communication, including:
a second processor;
a second memory for storing instructions executable by the second processor;
wherein the second processor is configured to:
receive a third voice message from a first terminal;
detect whether the third voice message carries a supplementary identification, the supplementary identification for indicating that a voice content included in the third voice message is a supplementary voice content; and
send the voice content included in the third voice message to a second terminal as a supplementary voice content of a fourth voice message when the third voice message carries the supplementary identification, the fourth voice message being a voice message sent from the first terminal to the second terminal before the first terminal sends the third voice message.

An embodiment of the present disclosure provides a device for voice communication, including:

a third processor;

a third memory for storing instructions executable by the third processor;

wherein the third processor is configured to:

receive a voice supplementing request from a server, the voice supplementing request for requesting taking a voice content included in a third voice message as a supplementary voice content of a fourth voice message, the fourth voice message being a voice message received before receiving the third voice message, the voice supplementing request carrying the third voice message, a supplementary identification and an identification of the fourth voice message, the supplementary identification for indicating that the voice content included in the third voice message is a supplementary voice content, and the identification of the fourth voice message for uniquely identifying the fourth voice message; and take the voice content included in the third voice message as the supplementary voice content of the fourth voice message according to the voice supplementing request.

With respect to the devices in the above embodiments, the specific manners for performing operations of individual modules therein have been described in detail in the embodiments regarding the relevant methods, which will not be elaborated herein.

Figure 9:
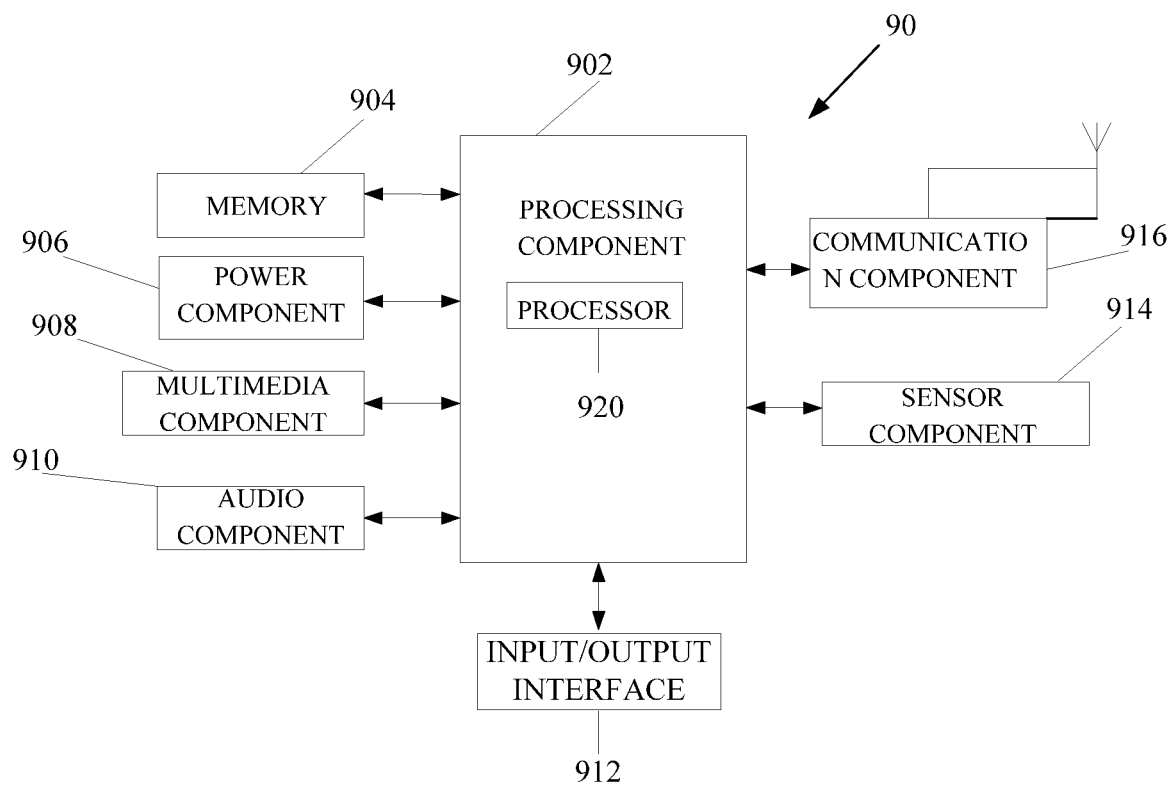
FIG. 9 is a block diagram illustrating the construction of a device for voice communication according to an exemplary embodiment.

FIG. 9 is a block diagram illustrating a device 90 for voice communication according to an exemplary embodiment, and the device is applied to a terminal device. For example, the device 90 may be a mobile phone, a computer, a digital broadcast terminal, a messaging device, a gaming console, a tablet, a medical device, an exercise equipment, a personal digital assistant, and the like.

The device 90 can include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 90, such as the operations associated with display, telephone calls, data communications, camera operations, and recording operations. The processing component 902 can include one or more processors 920 to execute instructions to perform all or part of the blocks in the above described methods. Moreover, the processing component 902 can include one or more modules which facilitate the interaction between the processing component 902 and other components. For instance, the processing component 902 can include a multimedia module to facilitate the interaction between the multimedia component 908 and the processing component 902.

The memory 904 is configured to store various types of data to support the operation of the device 90. Examples of such data include instructions for any application or method operated on the device 90, contact data, phonebook data, messages, pictures, video, etc. The memory 904 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 90. The power component 906 can include a power management system, one or more power sources, and any other components associated with the generation, management, and distribution of power in the device 90.

The multimedia component 908 includes a screen providing an output interface between the device 90 and the user. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 908 includes a front camera and/or a rear camera. The front camera and/or the rear camera can receive an external multimedia datum while the device 90 is in an operation mode, such as a photographing mode or a video mode. Each of the front camera and the rear camera can be a fixed optical lens system or have focus and optical zoom capability.

The audio component 910 is configured to output and/or input audio signals. For example, the audio component 910 includes a microphone ("MIC") configured to receive an external audio signal when the device 90 is in an operation mode, such as a call mode, a recording mode, and a voice recognition mode. The received audio signal can be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons can include, but are not limited to, a home button, a volume button, a starting button, and a locking button.

The sensor component 914 includes one or more sensors to provide status assessments of various aspects for the device 90. For instance, the sensor component 914 can detect an open/closed status of the device 90, relative positioning of components, e.g., the display and the keypad of the device 90. The sensor component 914 can also detect a change in position of the device 90 or a component of the device 90, a presence or absence of user contact with the device 90, an orientation or an acceleration/deceleration of the device 90, and a change in temperature of the device 90. The sensor component 914 can include a proximity sensor configured to detect the presence of nearby objects without any physical contact. The sensor component 914 can also include a light sensor, such as a CMOS or CCD image sensor, for use in imaging applications. In some embodiments, the sensor component 914 can also include an accelerometer sensor, a gyroscope sensor, a magnetic sensor, a pressure sensor, or a temperature sensor.

The communication component 916 is configured to facilitate communication, wired or wirelessly, between the device 90 and other devices. The device 90 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 90 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 904 including instructions, and the above instructions are executable by the processor 920 in the device 90 to perform the above-described methods as shown in FIG. 1a, 1c to 1e, or 3. For example, the non-transitory computer-readable storage medium can be a ROM, a RAM, a CD-ROM, a magnetic tape, a floppy disc, an optical data storage device, and the like.

Figure 10:
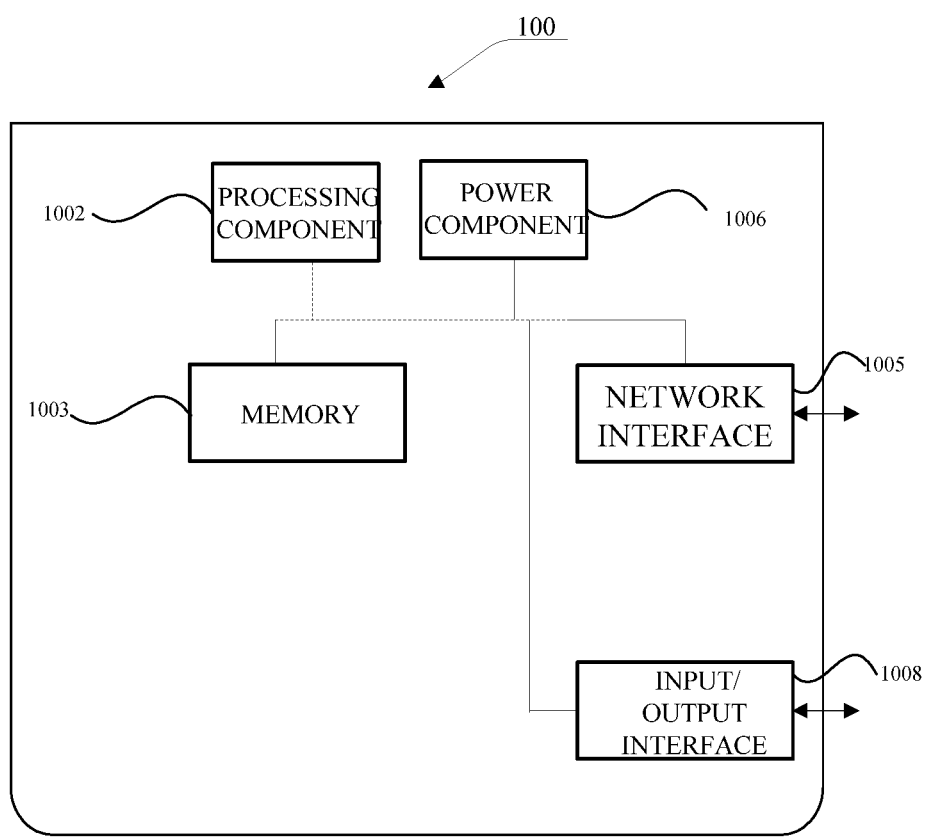
FIG. 10 is a block diagram illustrating the construction of another device for voice communication according to an exemplary embodiment.

FIG. 10 is a block diagram illustrating a device 100 for voice communication according to an exemplary embodiment. For example, the device 100 may be provided as a server. The device 100 includes a processing component 1002 that further includes one or more processors, and memory resources represented by a memory 1003 for storing instructions executable by the processing component 1002, such as application programs. The application programs stored in the memory 1003 may include one or more modules individually corresponding to a set of instructions. Further, the processing component 1002 is configured to execute the instructions to perform the above described method as shown in FIGS. 2a, 2b and 2c.

The device 100 may also include a power component 1006 configured to perform power management of the device 100, wired or wireless network interface(s) 1005 configured to connect the device 100 to a network, and an input/output (I/O) interface 1008. The device 100 may operate based on an operating system stored in the memory 1003, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including common general knowledge or customary technical means not disclosed by the disclosure in the art. It is intended that the specification and examples shall be considered as exemplary only, and the true scope and spirit of the disclosure shall be indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only shall be limited by the appended claims.

What is claimed is:

1. A method for voice communication, applied in a terminal device, comprising:
    acquiring a first operation instruction for instructing to acquire a supplementary voice content of a first voice message, which is used for supplementing the first voice message;
    acquiring the supplementary voice content of the first voice message according to the acquired first operation instruction;
    generating a second voice message according to the supplementary voice content, the second voice message including a supplementary identification for indicating that the voice content included in the second voice message is a supplementary voice content; and
    sending the second voice message to a server,
    wherein acquiring a first operation instruction comprises:
        determining whether the first voice message is complete; and
        acquiring the first operation instruction when the first voice message is incomplete;
    wherein determining whether the first voice message is complete comprises:
        comparing a first time duration of a valid voice content in the first voice message with a preset proportion of a second time duration, the second time duration being a time duration for which a microphone is turned on for generating the first voice message; and
        determining that the first voice message is incomplete when the first time duration of the valid voice content in the first voice message is shorter than or equal to the preset proportion of the second time duration;
    wherein the method further comprises:
        displaying a prompt message when the first voice message is incomplete, the prompt message for informing the user that the first voice message is incomplete.

2. The method of claim 1, wherein determining whether the first voice message is complete comprises:
    comparing a first time duration of a valid voice content in the first voice message with a preset proportion of a second time duration, the second time duration being a time duration for which a microphone is turned on for generating the first voice message; and
    determining that the first voice message is incomplete when the first time duration of the valid voice content in the first voice message is shorter than or equal to the preset proportion of the second time duration.

3. The method of claim 1, further comprising:
    storing the supplementary voice content included in the second voice message at a storage address corresponding to the first voice message.

4. The method of claim 1, further comprising:
    storing the supplementary voice content included in the second voice message at a storage address corresponding to the first voice message.

5. The method of claim 1, further comprising:
    storing the supplementary voice content included in the second voice message at a storage address corresponding to the first voice message.

6. The method of claim 1, wherein acquiring a first operation instruction comprises:
    acquiring the first operation instruction through a voice icon corresponding to the first voice message in a user interface.

7. A terminal device, comprising:
a processor; and
a memory storing instructions executable by the processor,
wherein, when executing the instructions, the processor is configured to:
acquire a first operation instruction for instructing to acquire a supplementary voice content of a first voice message, which is used for supplementing the first voice message;
acquire the supplementary voice content of the first voice message according to the acquired first operation instruction;
generate a second voice message according to the supplementary voice content, the second voice message including a supplementary identification for indicating that the voice content included in the second voice message is a supplementary voice content; and
send the second voice message to a server,
wherein the processor configured to acquire the first operation instruction is configured to:
determine whether the first voice message is complete; and
acquire the first operation instruction when the first voice message is incomplete;
wherein the processor configured to determine whether the first voice message is complete is configured to:
compare a first time duration of a valid voice content in the first voice message with a preset proportion of a second time duration, the second time duration being a time duration for which a microphone is turned on for generating the first voice message; and
determine that the first voice message is incomplete when the first time duration of the valid voice content in the first voice message is shorter than or equal to the preset proportion of the second time duration;
wherein the processor is further configured to:
display a prompt message when the first voice message is incomplete, the prompt message for informing the user that the first voice message is incomplete.

8. The terminal device of claim 7, wherein the processor configured to determine whether the first voice message is complete is configured to:
compare a first time duration of a valid voice content in the first voice message with a preset proportion of a second time duration, the second time duration being a time duration for which a microphone is turned on for generating the first voice message; and
determine that the first voice message is incomplete when the first time duration of the valid voice content in the first voice message is shorter than or equal to the preset proportion of the second time duration.

9. The terminal device of claim 1, wherein the processor is further configured to:
store the supplementary voice content included in the second voice message at a storage address corresponding to the first voice message.

10. The terminal device of claim 7, wherein the processor is further configured to:
store the supplementary voice content included in the second voice message at a storage address corresponding to the first voice message.

11. The terminal device of claim 7, wherein the processor is further configured to:
store the supplementary voice content included in the second voice message at a storage address corresponding to the first voice message.

12. The terminal device of claim 7, wherein the processor configured to acquire the first operation instruction is configured to:
acquire the first operation instruction through a voice icon corresponding to the first voice message in a user interface.

13. A non-transitory computer-readable storage medium having stored therein instructions that, when executed by a processor of a terminal device, cause the terminal device to perform a method for voice communication, the method comprising:
acquiring a first operation instruction for instructing to acquire a supplementary voice content of a first voice message, which is used for supplementing the first voice message;
acquiring the supplementary voice content of the first voice message according to the acquired first operation instruction;
generating a second voice message according to the supplementary voice content, the second voice message including a supplementary identification for indicating that the voice content included in the second voice message is a supplementary voice content; and
sending the second voice message to a server,
wherein acquiring a first operation instruction comprises:
determining whether the first voice message is complete; and
acquiring the first operation instruction when the first voice message is incomplete;
wherein determining whether the first voice message is complete comprises:
comparing a first time duration of a valid voice content in the first voice message with a preset proportion of a second time duration, the second time duration being a time duration for which a microphone is turned on for generating the first voice message; and
determining that the first voice message is incomplete when the first time duration of the valid voice content in the first voice message is shorter than or equal to the preset proportion of the second time duration;
wherein the method further comprises:
displaying a prompt message when the first voice message is incomplete, the prompt message for informing the user that the first voice message is incomplete.

14. The storage medium of claim 13, wherein determining whether the first voice message is complete comprises:
comparing a first time duration of a valid voice content in the first voice message with a preset proportion of a second time duration, the second time duration being a time duration for which a microphone is turned on for generating the first voice message; and
determining that the first voice message is incomplete when the first time duration of the valid voice content in the first voice message is shorter than or equal to the preset proportion of the second time duration.

15. The storage medium of claim 13, wherein the method further comprises:
storing the supplementary voice content included in the second voice message at a storage address corresponding to the first voice message.

16. The storage medium of claim 13, wherein the method further comprises:
  storing the supplementary voice content included in the second voice message at a storage address corresponding to the first voice message.

17. The storage medium of claim 13, wherein the method further comprises:
  storing the supplementary voice content included in the second voice message at a storage address corresponding to the first voice message.

18. The storage medium of claim 13, wherein acquiring a first operation instruction comprises:
  acquiring the first operation instruction through a voice icon corresponding to the first voice message in a user interface.

* * * * *